(12) United States Patent
Palanisamy

(10) Patent No.: US 11,913,406 B2
(45) Date of Patent: Feb. 27, 2024

(54) HIDDEN DOOR THRUST REVERSER SYSTEM FOR AN AIRCRAFT PROPULSION SYSTEM

(71) Applicant: Rohr, Inc., Chula Vista, CA (US)

(72) Inventor: Jai Ganesh Palanisamy, Bangalore (IN)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 17/224,357

(22) Filed: Apr. 7, 2021

(65) Prior Publication Data
US 2021/0310441 A1   Oct. 7, 2021

(30) Foreign Application Priority Data
Apr. 7, 2020  (IN) .............................. 202011015284

(51) Int. Cl.
  *F02K 1/70*   (2006.01)
  *F02K 1/76*   (2006.01)
(52) U.S. Cl.
  CPC ............... *F02K 1/70* (2013.01); *F02K 1/766* (2013.01)
(58) Field of Classification Search
  CPC . F02K 1/70; F02K 1/766; F02K 1/763; F02K 1/566; F02K 1/62; F02K 1/72
  See application file for complete search history.

(56) References Cited

U.S. PATENT DOCUMENTS

| | | | |
|---|---|---|---|
| 3,262,268 A * | 7/1966 | Beavers | F02K 1/72 239/265.19 |
| 3,511,055 A * | 5/1970 | Timms | F02K 1/72 239/265.29 |
| 7,874,142 B2 | 1/2011 | Beardsley | |
| 8,904,751 B2 | 12/2014 | Howarth | |
| 9,482,181 B2 | 11/2016 | Hurlin | |
| 9,784,214 B2 | 10/2017 | Gormley | |
| 10,041,443 B2 | 8/2018 | Foutch | |
| 10,208,708 B2 | 2/2019 | Gormley | |
| 10,302,044 B2 | 5/2019 | Schrell | |
| 10,533,519 B2 | 1/2020 | Gormley | |
| 2007/0007388 A1* | 1/2007 | Harrison | F02K 1/72 244/110 B |

(Continued)

OTHER PUBLICATIONS

EP search report for EP21167261.3 dated Jan. 7, 2022.
EP Office Action for EP Patent Application 21167261.3 dated Nov. 9, 2023.

*Primary Examiner* — Thomas P Burke
(74) *Attorney, Agent, or Firm* — GETZ BALICH LLC

(57) ABSTRACT

A thrust reverser system is provided that includes a sleeve, a fixed cascade structure and a blocker door. The fixed cascade structure is within a cavity of the sleeve when the sleeve is in a sleeve stowed position. The blocker door is within the cavity of the sleeve when the sleeve is in the sleeve stowed position and the blocker door is in a blocker door stowed position. The blocker door projects in a radial inward direction away from the sleeve towards the centerline when the sleeve is in a sleeve deployed position and when the blocker door is in a blocker door deployed position. The blocker door includes a pivot attachment fixed at an end of the blocker door. The pivot attachment is configured to move in a forward direction from a first location to a second location.

7 Claims, 16 Drawing Sheets

(56) References Cited

U.S. PATENT DOCUMENTS

| | | | |
|---|---|---|---|
| 2011/0277448 A1* | 11/2011 | Roberts | F02K 1/625 |
| | | | 60/226.2 |
| 2015/0267640 A1* | 9/2015 | Gormley | F02K 1/80 |
| | | | 239/265.19 |
| 2016/0131082 A1* | 5/2016 | Gormley | F02K 1/766 |
| | | | 239/265.19 |
| 2016/0153399 A1 | 6/2016 | Sawyers-Abbott | |
| 2016/0169157 A1 | 6/2016 | Sawyers-Abbott | |
| 2017/0198659 A1 | 7/2017 | Gormley | |
| 2017/0226962 A1* | 8/2017 | Crawford | F04D 29/522 |
| 2017/0328304 A1 | 11/2017 | Gormley | |
| 2018/0038313 A1 | 2/2018 | Wawrzynek et al. | |
| 2019/0017469 A1 | 1/2019 | Morgan | |
| 2019/0032600 A1 | 1/2019 | Beasman | |
| 2020/0003154 A1* | 1/2020 | Carr | F02K 1/763 |
| 2020/0011272 A1* | 1/2020 | Gormley | F02K 1/72 |
| 2020/0018258 A1 | 1/2020 | Aziz | |
| 2020/0088134 A1* | 3/2020 | Gormley | F02K 1/70 |

* cited by examiner

HIDDEN DOOR THRUST REVERSER SYSTEM FOR AN AIRCRAFT PROPULSION SYSTEM

This application claims priority to Indian Patent Appln. No. 202011015284 filed Apr. 7, 2020, which is hereby incorporated herein by reference in its entirety.

BACKGROUND

1. Technical Field

This disclosure relates generally to an aircraft propulsion system and, more particularly, to translating sleeve thrust reverser operating with hidden blocker doors in an aircraft propulsion system.

2. Background Information

A propulsion system for an aircraft may include a thrust reverser system for providing reverse thrust. Various types and configurations of thrust reverser systems are known in the art. While these known thrust reverser systems have various advantages, there is still room in the art for an improved thrust reverser system.

SUMMARY OF THE DISCLOSURE

According to an aspect of the present disclosure, an assembly is provided for an aircraft propulsion system. This assembly includes a thrust reverser system which includes a sleeve, a fixed cascade structure and a blocker door. The sleeve is configured to translate in an aft direction along a centerline from a sleeve stowed position to a sleeve deployed position. The fixed cascade structure is disposed within a cavity of the sleeve when the sleeve is in the sleeve stowed position. The blocker door is configured to move between a blocker door stowed position and a blocker door deployed position. The blocker door is disposed within the cavity of the sleeve when the sleeve is in the sleeve stowed position and the blocker door is in the blocker door stowed position. The blocker door projects in a radial inward direction away from the sleeve towards the centerline when the sleeve is in the sleeve deployed position and the blocker door is in the blocker door deployed position. The blocker door includes a pivot attachment fixed at an end of the blocker door. The pivot attachment is configured to move in a forward direction from a first location to a second location.

According to another aspect of the present disclosure, a thrust reverser system is provided for an aircraft propulsion system. This thrust reverser system includes a sleeve, a fixed cascade, a blocker door and a blocker door actuation assembly. The sleeve is configured to translate in an aft direction along a centerline from a sleeve stowed position to a sleeve deployed position. The fixed cascade structure is disposed within an interior cavity of the sleeve when the sleeve is in the sleeve stowed position. The blocker door is configured to move between a blocker door stowed position and a blocker door deployed position. The blocker door is disposed within the interior cavity of the sleeve when the sleeve is in the sleeve stowed position and the blocker door is in the blocker door stowed position. The blocker door projects in a radial inward direction away from the sleeve towards the centerline when the sleeve is in the sleeve deployed position and the blocker door is in the blocker door deployed position. The blocker door actuation assembly is configured to initiate movement of the blocker door from the blocker door stowed position to the blocker door deployed position while the sleeve is translating in the aft direction and the sleeve is at a sleeve intermediate position between the sleeve stowed position and the sleeve deployed position. The blocker door actuation assembly is configured as or otherwise includes a scissor-type linkage.

According to still another aspect of the present disclosure, another thrust reverser system is provided for an aircraft propulsion system. This thrust reverser system includes a translating component, a blocker door, a fixed guide, a first lateral track slider, a second lateral track slider, an axial track slider, a latch, a first slider-to-slider link, a first slider-to-latch link, a second slider-to-slider link and a second slider-to-latch link. The translating component is configured to translate in a first direction along a centerline from a component first position to a component second position. A component intermediate position is between the component first position and the component second position. The blocker door is configured to move between a blocker door stowed position and a blocker door deployed position. The blocker door includes a pivot attachment fixed at an end of the blocker door. The fixed guide includes a first lateral track, a second lateral track and an axial track. The first lateral track slider is configured to laterally translate along the first lateral track. The second lateral track slider is configured to laterally translate along the second lateral track. The axial track slider is configured to axially translate along the axial track. The axial track slider is configured to move the pivot attachment. The latch is laterally between the first lateral track slider and the second lateral track slider. The latch is configured to temporarily engage the translating component as the translating component translates from the component intermediate position towards the component deployed position. The first slider-to-slider link extends between and is pivotally connected to the first lateral track slider and the axial track slider. The first slider-to-latch link extends between and is pivotally connected to the first lateral track slider and the latch. The second slider-to-slider link extends between and is pivotally connected to the second lateral track slider and the axial track slider. The second slider-to-latch link extends between and is pivotally connected to the second lateral track slider and the latch.

The pivot attachment may be configured to move in a second direction along the centerline from a first location to a second location. The second direction may be opposite the first direction along the centerline. The blocker door may be in the blocker door stowed position when the pivot attachment is in the first location. The blocker door may be in the blocker door deployed position when the pivot attachment is in the second location.

A fixed structure may be included, which fixed structure may include a sleeve track. The sleeve may extend circumferentially about the centerline to a sleeve side. The sleeve may include a sleeve slider at the sleeve side. The sleeve slider may be configured to translate along the sleeve track as the sleeve translates between the sleeve stowed position and the sleeve deployed position.

The sleeve may be in a sleeve intermediate position between the sleeve stowed position and the sleeve deployed position. The thrust reverser system may also include a blocker door actuation assembly. The blocker door actuation assembly may be configured to initiate movement the blocker door from the blocker door stowed position towards the blocker door deployed position when the sleeve is in the sleeve intermediate position and translating towards the sleeve deployed position.

The blocker door actuation assembly may be configured as or otherwise include a scissor-type linkage.

A fixed structure may be included, which fixed structure may include a frame track. A frame may also be included, which frame may extend circumferentially about the centerline to a frame side. The frame may include a frame slider at the frame side. The frame slider may be configured to translate along the frame track as the blocker door moves towards and away from the blocker door deployed position. The pivot attachment may be pivotally attached the blocker door to the frame.

A second blocker door may be included that is configured to move between a second blocker door stowed position and a second blocker door deployed position. The second blocker door may include a second pivot attachment fixed at an end of the second blocker door. The second pivot attachment may pivotally attach the second blocker door to the frame.

The thrust reverser system may also include a latch configured to couple the frame with the sleeve as the sleeve translates in the aft direction from a sleeve intermediate position to the sleeve deployed position.

The thrust reverser system may also include a fixed guide, a lateral track slider, an axial track slider, a latch, a forward link and an aft link. The fixed guide may include a lateral track and an axial track. The lateral track slider may be configured to translate, laterally relative to the centerline, along the lateral track. The axial track slider may be configured to translate, axially along the centerline, along the axial track. The axial track slider may be coupled to the frame. The latch may be configured to selectively mate with the sleeve. The forward link may extend between and may be pivotally connected to the lateral track slider and the axial track slider. The aft link may extend between and may be pivotally connected to the lateral track slider and the latch.

The thrust reverser system may also include a second lateral track slider, a second forward link and a second aft link. The second lateral track slider may be configured to translate, laterally relative to the centerline, along a second lateral track of the fixed guide. The latch may be arranged laterally between the lateral track and the second lateral track. The second forward link may extend between and may be pivotally connected to the second lateral track slider and the axial track slider. The second aft link may extend between and may be pivotally connected to the second lateral track slider and the latch.

The lateral track slider and the second lateral track slider may be laterally separated by a first distance when the blocker door is in the blocker door stowed position. The lateral track slider and the second lateral track slider may be laterally separated by a second distance when the blocker door is in the blocker door deployed position. The first distance may be greater than the second distance.

A pin attachment may pivotally connect the aft link and the second aft link to the latch. The axial track slider and the pin attachment may be axially separated by a first distance when the blocker door is in the blocker door stowed position. The axial track slider and the pin attachment may be axially separated by a second distance when the blocker door is in the blocker door deployed position. The first distance may be less than the second distance.

The latch may include a thrust rod, a pin attachment, a yoke and a cam. The thrust rod may extend between a forward thrust rod end and an aft thrust rod end. The pin attachment may pivotally connect the aft link to the thrust rod at the aft thrust rod end. The yoke may be connected to the thrust rod at the forward thrust rod end. The yoke may be configured to engage a trigger mounted to the sleeve as the sleeve translates in the aft direction towards the sleeve deployed position. The cam may be pivotally connected to the latch. The cam may be configured to engage the trigger as the sleeve translates in the forward direction towards the sleeve stowed position. The trigger may be axially between the yoke and the cam when the trigger engages the latch.

The thrust reverser system may also include a blocker door actuation assembly configured to temporarily couple the pivot attachment with the sleeve when the sleeve translates between a sleeve intermediate position and the sleeve deployed position.

The thrust reverser may include a guide, a lateral track slider, an axial track slider, a latch, a slider-to-slider link and a slider-to-latch link. The guide may be fixed to the fixed cascade structure. The guide may include a lateral track and an axial track. The lateral track slider may be configured to laterally translate along the lateral track. The axial track slider may be configured to axially translate along the axial track. The axial track slider may be configured to facilitate movement of the pivot attachment between the first location and the second location. The latch may be configured to temporary couple with the sleeve while the sleeve translates between a sleeve intermediation position and the sleeve deployed position. The slider-to-slider link may extend between and may be pivotally connected to the lateral track slider and the axial track slider. The slider-to-latch link may extend between and may be pivotally connected to the lateral track slider and the latch.

The thrust reverser may also include a second lateral track slider, a second slider-to-slider link and a second slider-to-latch link. The second lateral track slider may be configured to translate along a second lateral track of the guide. The latch may be arranged laterally between the lateral track and the second lateral track. The second slider-to-slider link may extend between and may be pivotally connected to the second lateral track slider and the axial track slider. The second slider-to-latch link may extend between and may be pivotally connected to the second lateral track slider and the latch.

The blocker door actuation assembly may include a guide, a lateral track slider, an axial track slider, a latch, a slider-to-slider link and a slider-to-latch link. The guide may be fixed to the fixed cascade structure. The guide may include a lateral track and an axial track. The lateral track slider may be configured to laterally translate along the lateral track. The axial track slider may be configured to axially translate along the axial track. The axial track slider may be configured to move a pivot attachment of the blocker door. The latch may be configured to temporarily engage the sleeve while the sleeve is translating between the sleeve intermediate position and the sleeve deployed position. The slider-to-slider link may extend between and may be pivotally connected to the lateral track slider and the axial track slider. The slider-to-latch link may extend between and may be pivotally connected to the lateral track slider and the latch.

The blocker door may include a pivot attachment fixed at an aft end of the blocker door. The pivot attachment may be configured to move in a forward direction along the centerline from an aft location to a forward location.

The foregoing features and the operation of the invention will become more apparent in light of the following description and the accompanying drawings.

DETAILED DESCRIPTION

Figure 1:
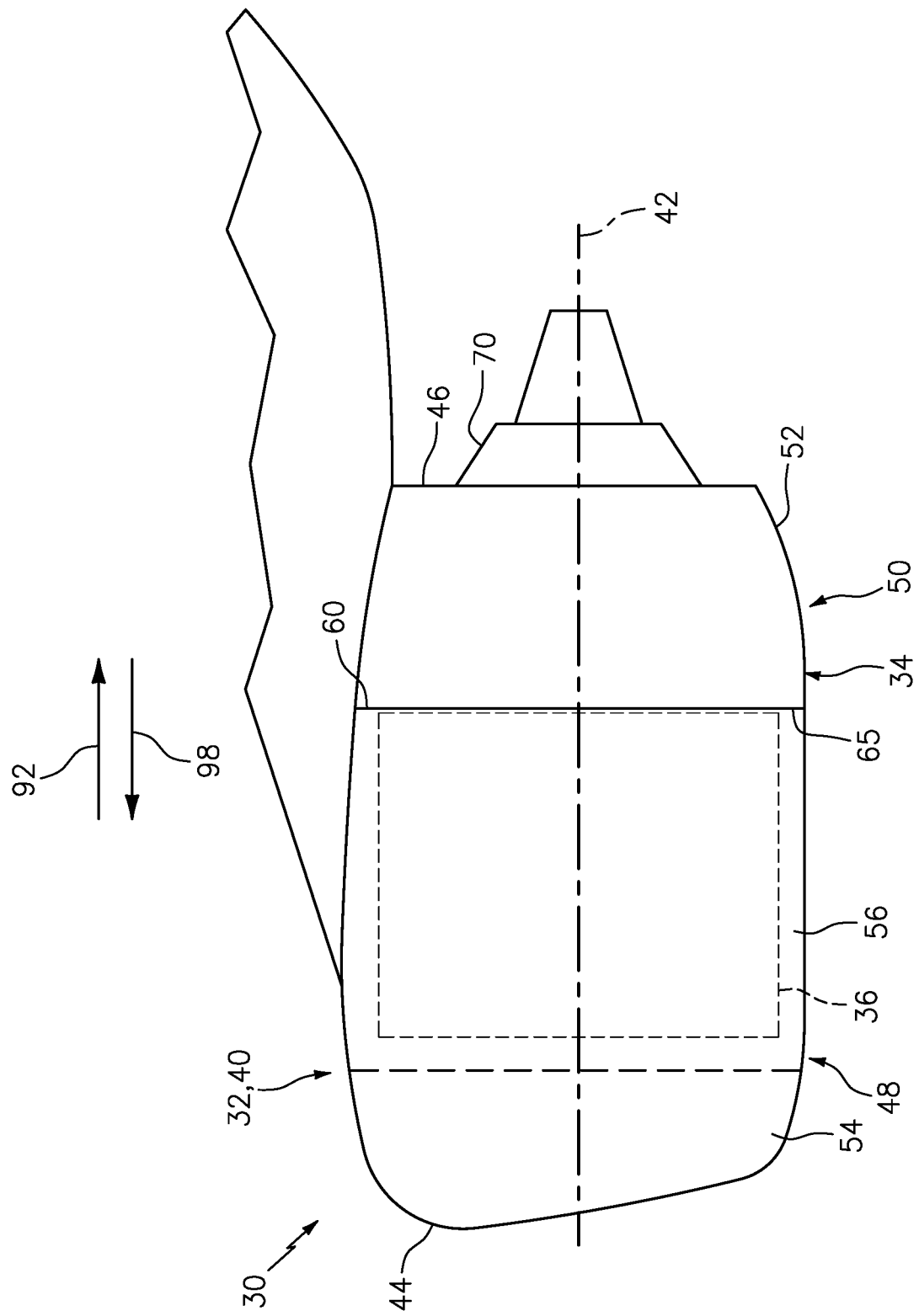
FIG. 1 is an illustration of a side of an aircraft propulsion system with its thrust reverser system stowed.

FIG. 1 illustrates an aircraft propulsion system 30 for an aircraft such as, but not limited to, a commercial airliner or a cargo plane. The propulsion system 30 includes a nacelle 32 and a gas turbine engine. This gas turbine engine may be configured as a turbofan engine as generally illustrated in FIG. 1. Alternatively, the gas turbine engine may be configured as a turbojet engine or any other type of gas turbine engine capable of propelling the aircraft. The propulsion system 30 also includes a thrust reverser system 34 configured with the nacelle 32; see also FIGS. 2 to 4.

Figure 3:
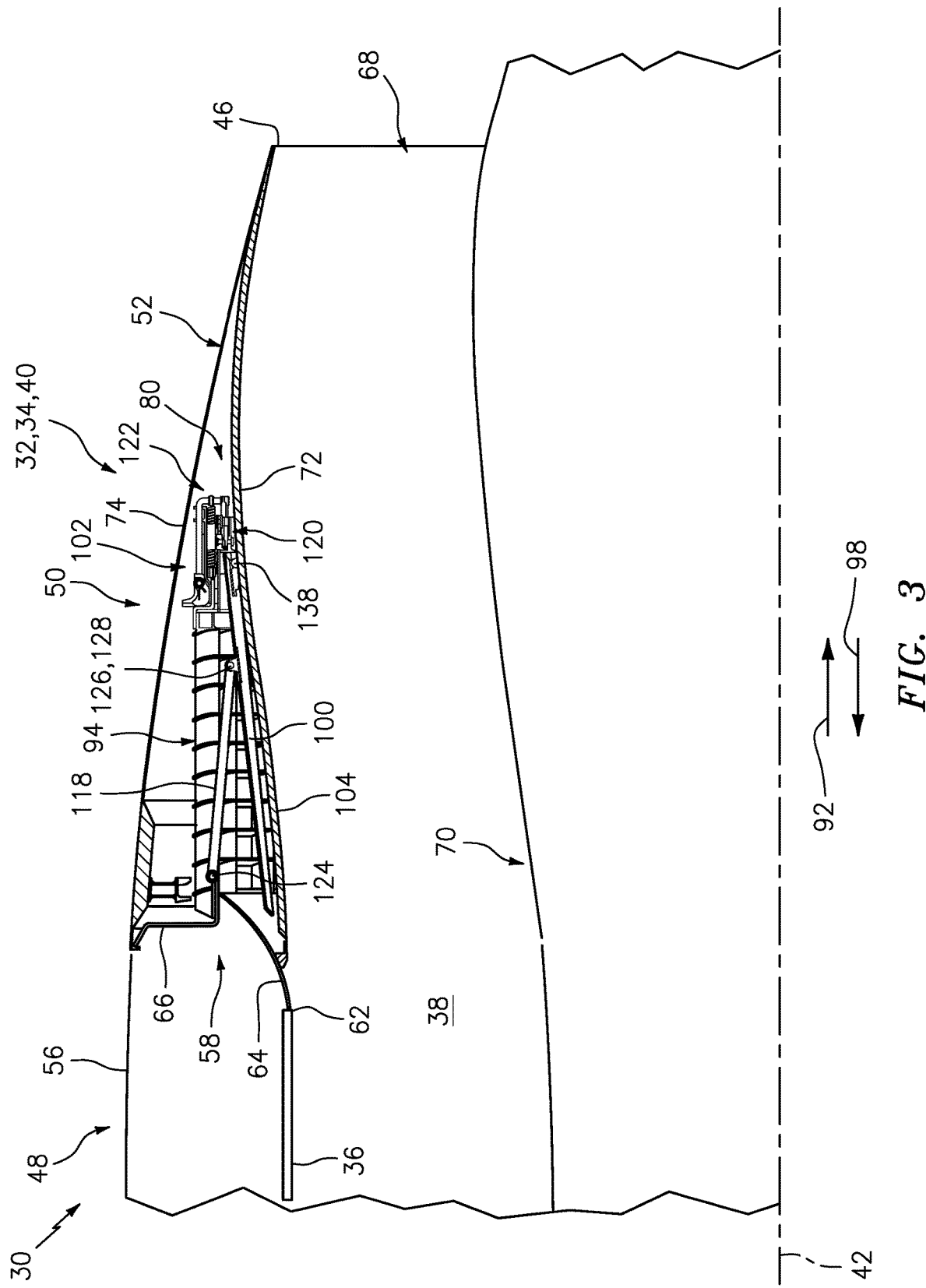
FIG. 3 is a side sectional illustration of a portion of the aircraft propulsion system with its thrust reverser system stowed.

The nacelle 32 of FIG. 1 substantially circumscribes and provides an aerodynamic covering for the gas turbine engine. Referring to FIG. 3, the nacelle 32 in combination with at least a fan case 36 of the gas turbine engine also form a bypass flow path 38 within the aircraft propulsion system 30. This bypass flow path 38 bypasses fan flow around a core of the gas turbine engine and is operable to route a majority (e.g., more than 75%) of engine thrust out of the aircraft propulsion system 30 in, for example, the case of a turbofan engine configuration.

Referring to FIG. 1, an outer structure 40 of the nacelle 32 extends axially along an axial centerline 42 of the aircraft propulsion system 30 (e.g., a rotational axis of the gas turbine engine) between a forward nacelle end 44 and an aft nacelle end 46. The nacelle outer structure 40 includes a forward nacelle structure 48 and an aft nacelle structure 50, which aft nacelle structure 50 is configured as or otherwise includes one or more translating sleeves 52; e.g., thrust reverser sleeves.

The forward nacelle structure 48 includes an inlet structure 54 (e.g., module or cowl), one or more fan cowls 56 (one not visible in FIG. 1) and a fixed/stationary support 58 (see FIG. 3). The inlet structure 54 is disposed at the forward nacelle end 44. The inlet structure 54 is configured to direct a stream of air through an inlet opening at the forward nacelle end 44 and into the gas turbine engine.

The first side fan cowl 56 is disposed on a first side of the aircraft propulsion system 30 (e.g., side visible in FIG. 1). The second side fan cowl 56 is disposed on a second side of the aircraft propulsion system 30 (e.g., side not visible in FIG. 1). Each fan cowl 56 is disposed axially between the inlet structure 54 and a respective one of the translating sleeves 52. Each fan cowl 56, for example, is disposed at an aft end 60 of the forward nacelle structure 48, and extends forward to the inlet structure 54. Each fan cowl 56 is generally axially aligned with a fan section of the gas turbine engine. Each fan cowl 56 is configured to provide an aerodynamic covering for the fan case 36, which fan case 36 circumscribes the fan section and partially forms an outer peripheral boundary of the bypass flow path 38; see FIG. 3.

Referring to FIG. 3, the stationary support 58 may be configured as or otherwise include a torque box for the thrust reverser system 34. This stationary support 58 is attached to the fan case 36 at (e.g., on, adjacent or proximate) an aft end 62 of the fan case 36. The stationary support 58 of FIG. 3 includes a ramp fairing structure 64 and a mounting structure 66; e.g., a bulkhead structure.

The stationary support 58 extends circumferentially about the centerline 42. The stationary support 58, for example, may include a pair of partially-annular segments (e.g., halves) arranged on opposing sides of the propulsion system 30. Alternatively, the stationary support 58 may have a substantially annular unitary body; e.g., may extend more than three-hundred and thirty degrees around the centerline 42.

Referring to FIG. 1, the first side translating sleeve 52 is disposed on the first side of the aircraft propulsion system 30 (e.g., side visible in FIG. 1). The second side translating sleeve 52 is disposed on the second side of the aircraft propulsion system 30 (e.g., side not visible in FIG. 1). Each translating sleeve 52 is disposed at the aft nacelle end 46, and extends axially between a forward end 65 of the respective translating sleeve 52 and the aft nacelle end 46. Each translating sleeve 52 is configured to further partially form the outer peripheral boundary of the bypass flow path 38 (see FIG. 3), which bypass flow path 38 extends through the propulsion system 30 to a trailing edge of an engine exhaust nozzle 68. The translating sleeves 52 may also form the nozzle 68 with an inner structure 70 of the nacelle 32 (often referred to as "an inner fixed structure"), which nacelle inner structure 70 houses the core of the gas turbine engine.

Figure 5:
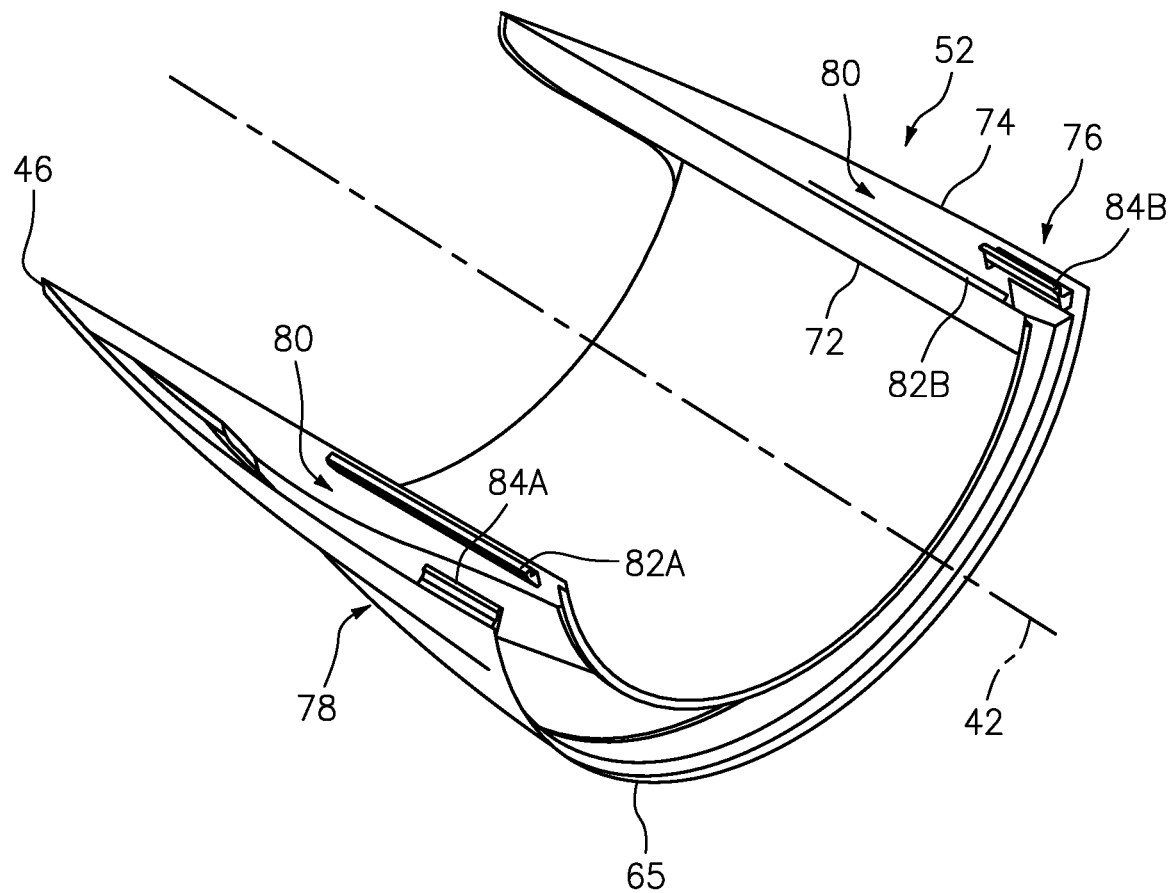
FIG. 5 is a perspective illustration of a translating sleeve.

Referring to FIG. 5, each translating sleeve 52 includes an inner sleeve panel 72 and an outer sleeve panel 74. Each of these sleeve panels 72 and 74 extends circumferentially about the centerline 42 between opposing sleeve sides 76 and 78. Each of the sleeve panels 72, 74 extends axially along the centerline 42 from or about the forward end 65 to the aft end 46. A forward end portion of the inner sleeve panel 72 is spaced radially inward of a forward end portion of the outer sleeve panel 74. An aft end portion of the inner sleeve panel 72 meets an aft end portion of the outer sleeve panel 74 at the aft end 46. The inner sleeve panel 72 and the outer sleeve panel 74 may thereby form an internal cavity 80 within the respective translating sleeve 52. This cavity 80 extends radially within the respective translating sleeve 52 between (and to) the inner sleeve panel 72 and the outer sleeve panel 74. The cavity 80 extends partially axially into the respective translating sleeve 52 from the forward end 65. The cavity 80 may also extend circumferentially through (or alternatively within) the respective translating sleeve 52.

Figure 6:
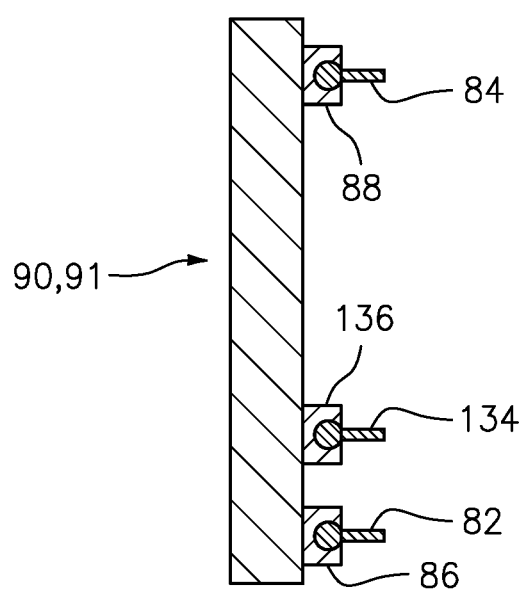
FIG. 6 is a schematic illustration of an interface between the translating sleeve, a translating frame and a fixed structure.

Each translating sleeve 52 is configured with one or more sleeve sliders 82A and 82B (generally referred to as "82") and 84A and 84B (generally referred to as "84"). The translating sleeve 52 of FIG. 5, for example, includes a pair of inner sleeve sliders 82 and a pair of outer sleeve sliders 84. The inner sleeve sliders 82A and 82B are disposed on and attached to opposing sides 76 and 78 and in the cavity 80 of the inner sleeve panel 72. The outer sleeve sliders 84A and 84B are disposed on an attached to opposing sides 76 and 78 and in the cavity 80 of the outer sleeve panel 74. Referring to FIG. 6, each of the sleeve sliders 82, 84 is configured to mate with a respective sleeve track 86, 88 connected to a fixed/stationary structure such as, but not limited to, a hinge beam 90 attached to a pylon structure or a latch beam 91 (e.g., at the lower side); see FIG. 2. Each of the sleeve sliders 82, 84 is also configured to move (e.g., translate) along the respective sleeve track 86, 88.

Figure 2:
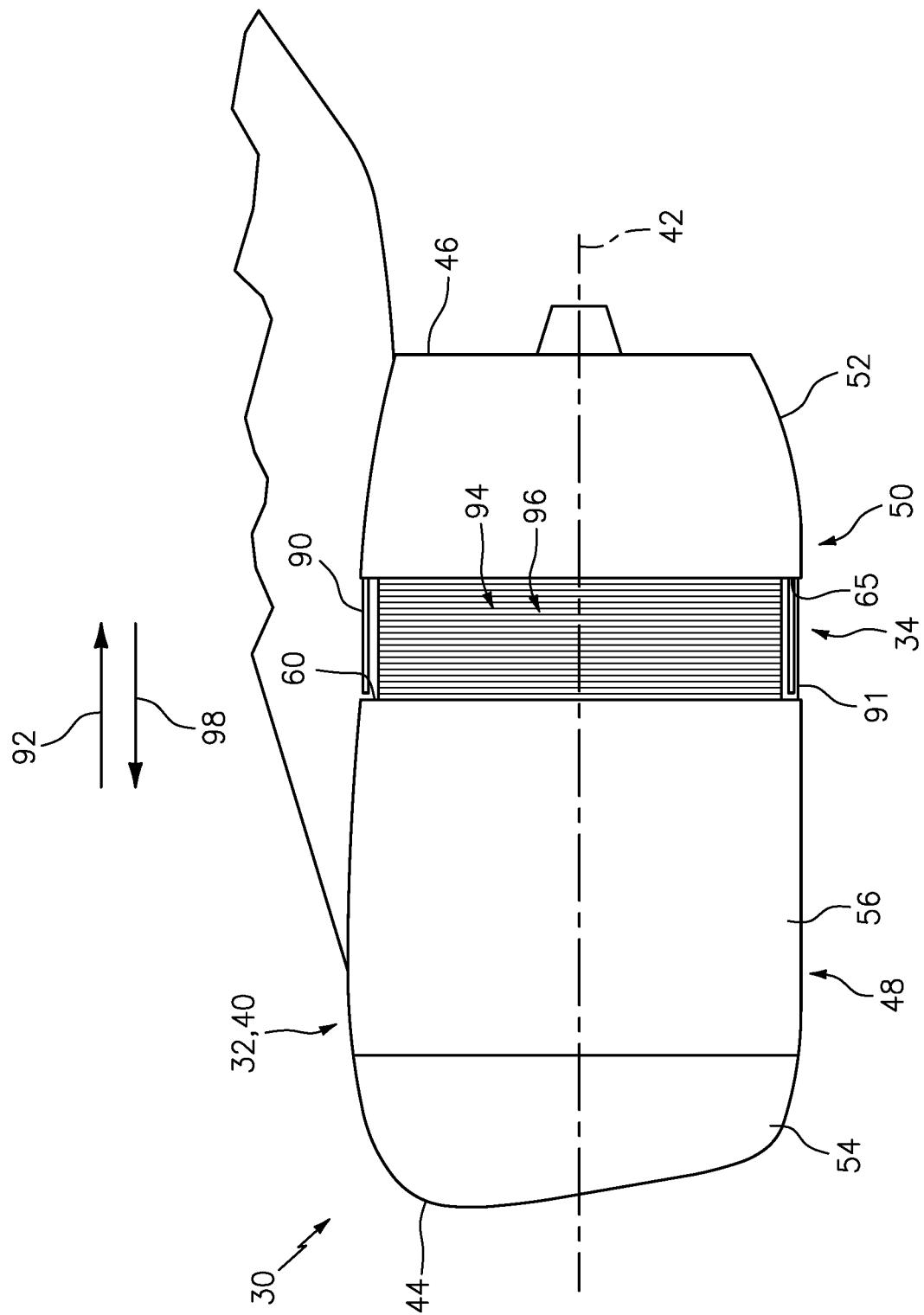
FIG. 2 is an illustration of the side of the aircraft propulsion system with its thrust reverser system deployed.

Referring to FIGS. 1 and 2, with foregoing arrangement, each translating sleeve 52 may move (e.g., translate) axially along the centerline 42 between a forward, sleeve stowed position (see FIG. 1) and an aft, sleeve (e.g., fully) deployed position (see FIG. 2). More particular, when being deployed, each translating sleeve 52 may translate in a first (e.g., aft) direction 92 along the centerline 42 from the sleeve stowed position (see FIG. 1) to the sleeve deployed position (see FIG. 2). In this deployed position of FIG. 2, each translating sleeve 52 at least partially (or substantially completely) uncovers at least one of more other components of the thrust reverser system 34 such as, but not limited to, at least one respective fixed cascade structure 94. The translating sleeve 52 also opens a respective thrust reverser passage 96 that extends radially through the nacelle outer structure 40; see also FIG. 4. When being stowed, the translating sleeve 52 may translate in a second (e.g., forward) direction 98 along the centerline 42 from the sleeve deployed position (see FIG. 2) to the sleeve stowed position (see FIG. 1), where the second direction 98 is opposite to the first direction 92 along the centerline 42. In this stowed position of FIG. 1, each translating sleeve 52 at least partially (or substantially completely) covers the at least one or more other components of the thrust reverser system 34 such as, but not limited to, the respective fixed cascade structure 94. The translating sleeve 52 also closes (e.g., covers) the respective thrust reverser passage 96.

Figure 7:
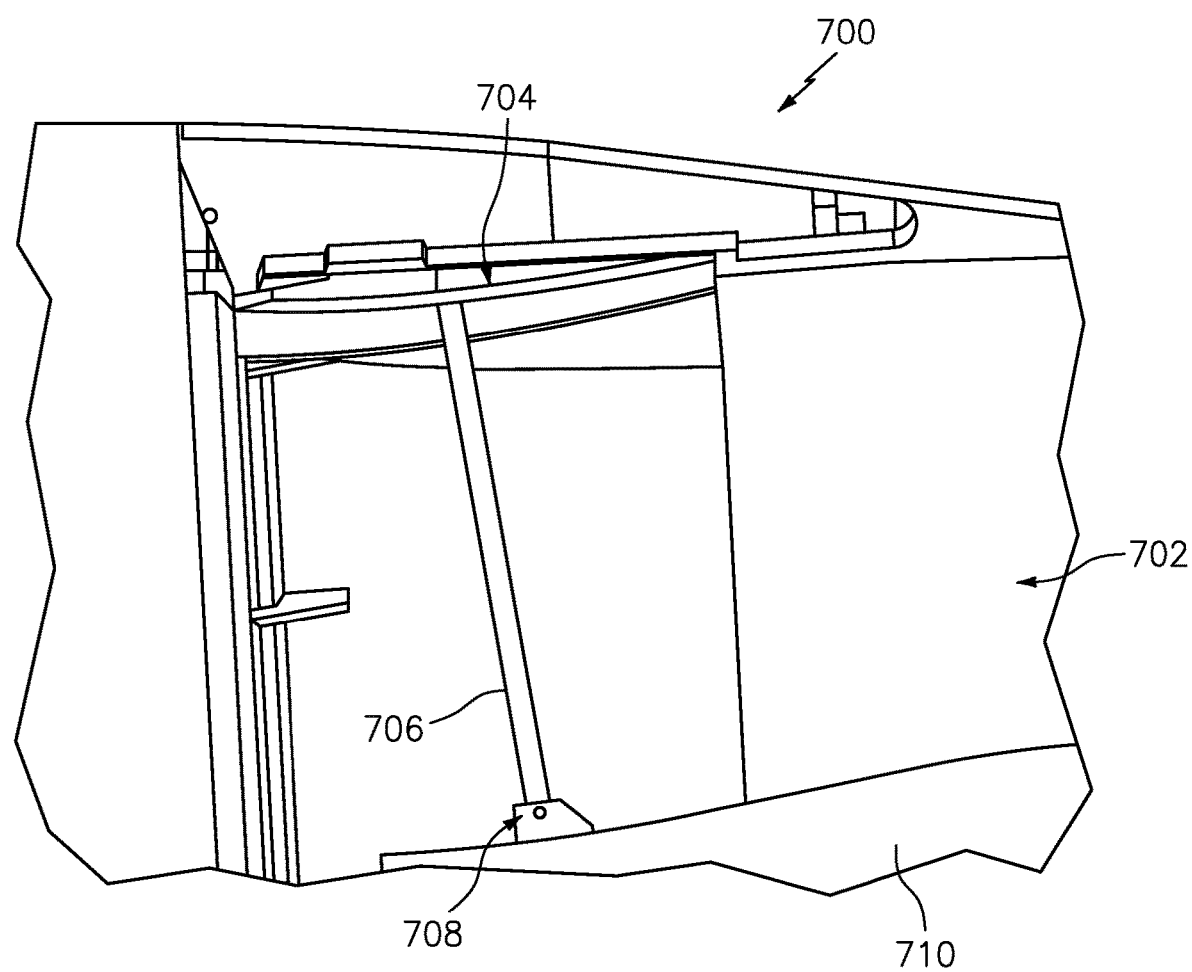
FIG. 7 is a side sectional illustration of a portion of a prior art aircraft propulsion system with its thrust reverser system stowed.

Referring to FIG. 3, the cavities 80 are provided with the nacelle 32 to house one or more components of the thrust reverser system 34 (when stowed) and, thereby, provide the bypass flow path 38 with fewer flow obstructions during typical forward flight propulsion system operation. By contrast, referring now to FIG. 7, a typical prior art thrust reverser system 700 includes multiple components which can obstruct air flow through a bypass flow path 702 even when stowed. These components can include blocker doors 704, where gaps (seams) between each blocker door 704 and adjacent elements can disrupt and turbulate boundary layer air flow. The component can also include drag links 706 and associated fittings 708, which fittings 708 project into the bypass flow path 702 and to secure the drag links 706 to an inner fixed structure 710, and which the drag links 706 extend radially through the bypass flow path 702 between the fittings 708 and the blocker doors 704.

Referring again now to FIG. 3, the thrust reverser system 34 of the present disclosure includes the stationary support 58, the translating sleeves 52 and, associated with each translating sleeve 52, a respective one of the cascade structures 94, one or more blocker doors 100 and a blocker door actuation system 102. To reduce flow obstructions to air flow within the bypass flow path 38, the thrust reverser components (e.g., 94, 100, 102 and 118) are arranged respectively within the cavities 80 when the translating sleeves 52 are stowed. In this manner, each inner sleeve panel 72 may have a substantially uninterrupted inner surface 104 that substantially axially abuts against the fan case 36 when stowed. Of course, an axial gap may exist between the fan case 36 and the inner surface 104 depending on the specific configuration of other nacelle structures such as the ramp fairing structure 64.

The cascade structures 94 are arranged about the centerline 42, for example, on opposing sides of the propulsion system 30. For example, the first side cascade structure 94 is disposed on the first side of the aircraft propulsion system 30 (e.g., side visible in FIG. 2). The second side cascade structure 94 is disposed on the second side of the aircraft propulsion system 30 (e.g., side not visible in FIG. 2).

Figure 4:
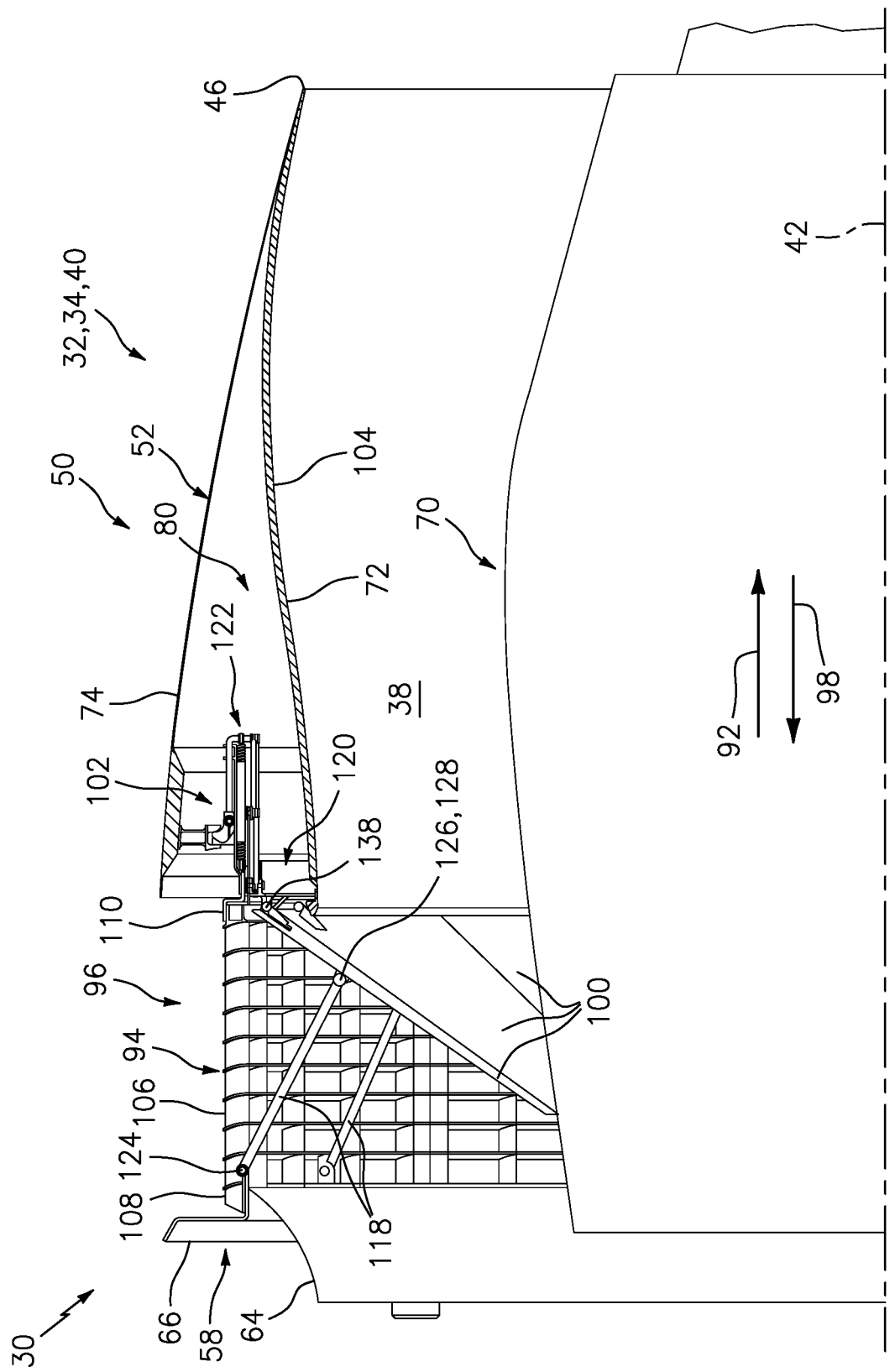
FIG. 4 is a side sectional illustration of a portion of the aircraft propulsion system with its thrust reverser system deployed.

Each cascade structure 94 of FIG. 4 includes a cascade 106 and one or more cascade structure mounts 108 and 110. The cascade 106 includes an axial array of turning vanes. The cascade 106 is connected to and extends axially between the cascade structure first (e.g., forward) mount 108 and the cascade structure second (e.g., aft) mount 110. The cascade structure first mount 108 fixedly attaches the respective cascade structure 94 to the stationary support 58. The respective cascade structure 94 thereby projects in the first direction 92 away from the stationary support 58 and across the respective thrust reverser passage 96 to the cascade structure second mount 110.

Figure 8:
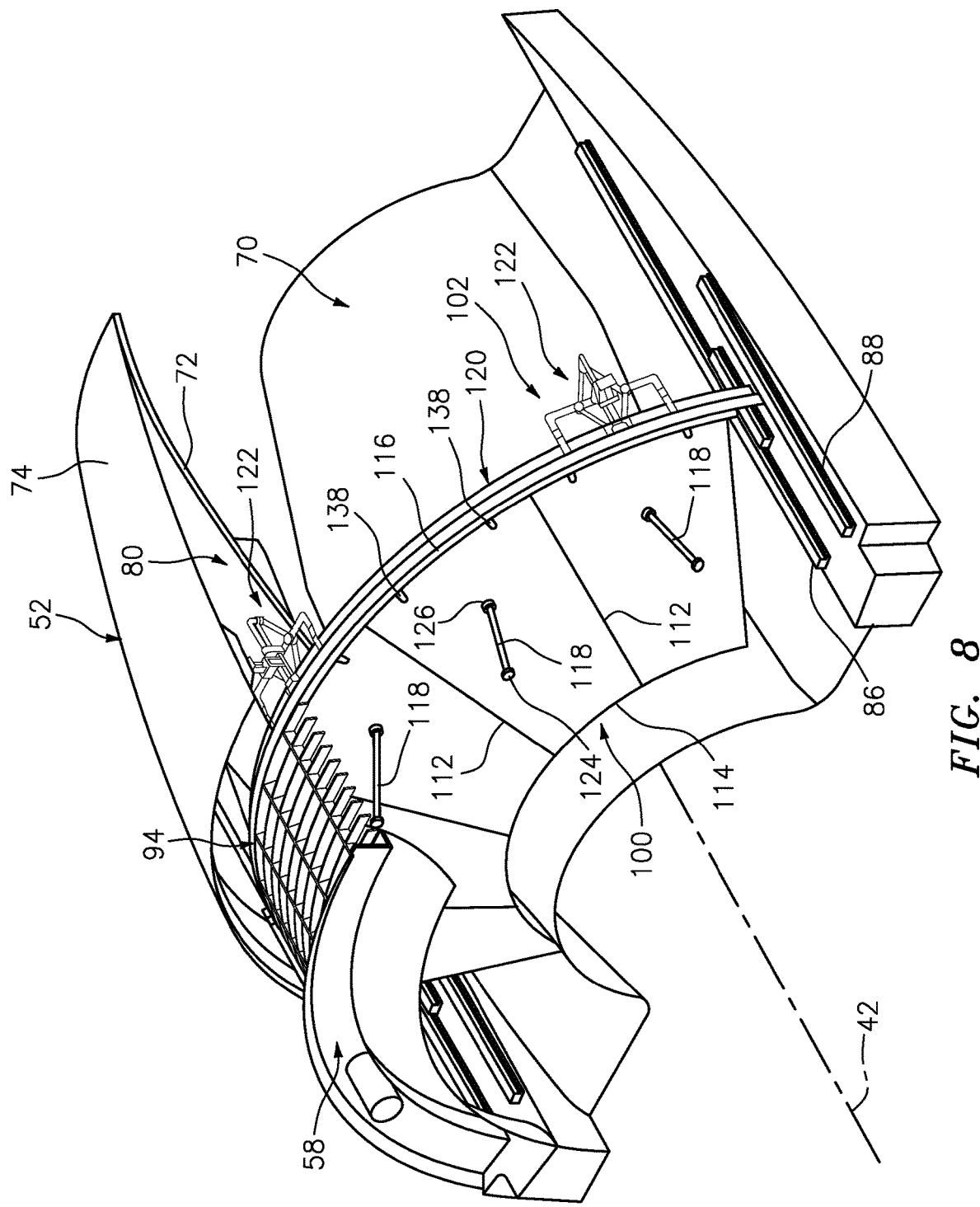
FIG. 8 is a perspective, cutaway illustration of an aft structure along with the thrust reverser system deployed.

Referring to FIG. 8, the blocker doors 100 are arranged about the centerline 42 in, for example, a pair of partially annular arrays. These partially annular arrays of the blocker doors 100 may be arranged respectively on opposing sides of the propulsion system 30, where each of the partially annular arrays is aligned with a respective one of the cascade structures 94. Each of the blocker doors 100 extends circumferentially between opposing sides 112. Each of the blocker doors 100 extends axially between a blocker door first (e.g., forward) end 114 and a blocker door second (e.g., aft) end 116.

Each blocker door actuation system 102 of FIG. 8 includes one or more links 118 (e.g., linkages, link arms, rods, etc.), a translating frame 120 (e.g., a blocker door carriage) and one or more actuator systems 122 (e.g., reverse movement systems). Each link 118 extends longitudinally between a link first (e.g., forward) end 124 and a link second (e.g., aft) end 126. Referring to FIGS. 3 and 4, each link 118 is moveably (e.g., pivotally) attached to the stationary support 58 at its first end 124 (or to the fixed cascade structure 94 or any other stationary structure) by, for example, a pivot (e.g., pin) connection. Each link 118 is moveably (e.g., pivotally) attached to a respective one of the blocker doors 100 at its second end 126 by, for example, a pivot (e.g., pin) connection. Each link 118 of FIGS. 3 and 4, for example, is pivotally attached to a mount 128 projecting radially outward from a panel of the blocker door 100; see also FIG. 8. Each mount 128 of FIG. 8 is positioned at an axial and/or laterally (e.g., circumferentially or tangentially) intermediate location along the blocker door 100.

Figure 9:
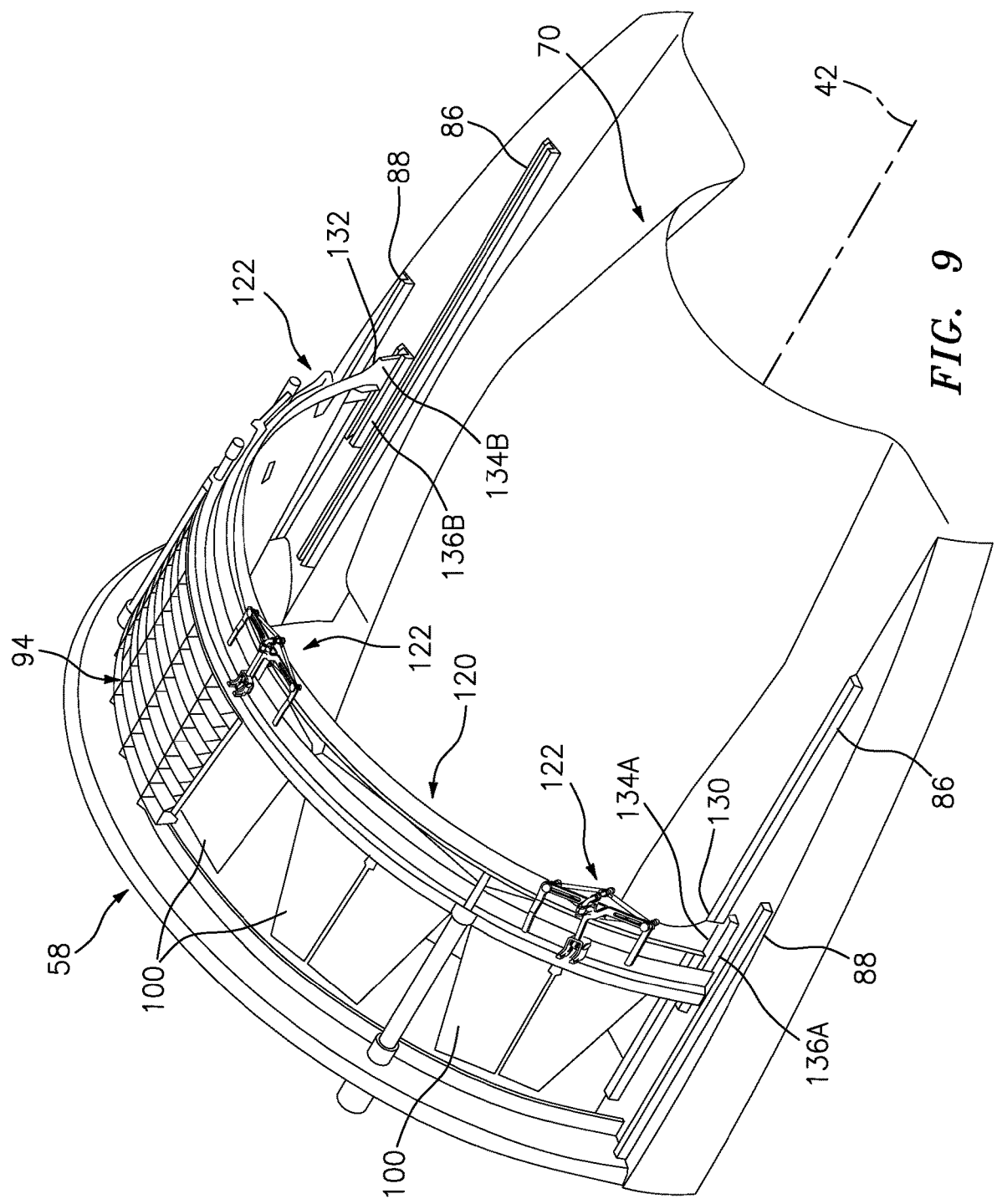
FIG. 9 is a perspective, cutaway illustration of inner components of the aft structure along with the thrust reverser system stowed.

Referring to FIG. 9, each translating frame 120 extends circumferentially about the centerline 42 between opposing frame sides 130 and 132. Each translating frame 120 is configured with one of more frame sliders 134A and 134B (generally referred to as "134"). These frame sliders 134A and 134B are disposed on and connected to (e.g., formed integral with or otherwise attached to) the opposing sides 130 and 132 of the translating frame 120. Referring to FIG. 6, each frame slider 134 is configured to mate with a respective frame track 136A and 136B (generally referred to as "136") connected to the fixed/stationary structure such as, but not limited to, the hinge beam 90 (e.g., at the upper side) or the latch beam 91 (e.g., at the lower side). Each of the frame sliders 134 is also configured to move (e.g., translate) along the respective frame track 136.

Referring to FIG. 8, the blocker doors 100 are movably (e.g., pivotally) attached to the respective translating frame 120. Each blocker door 100 of FIG. 8, for example, includes one or more pivot attachments 138 at the second end 116. These pivot attachments 138 pivotally attach that blocker door 100 to the respective translating frame 120 through, for example, a pivot (e.g., pin) connection.

Figure 10:
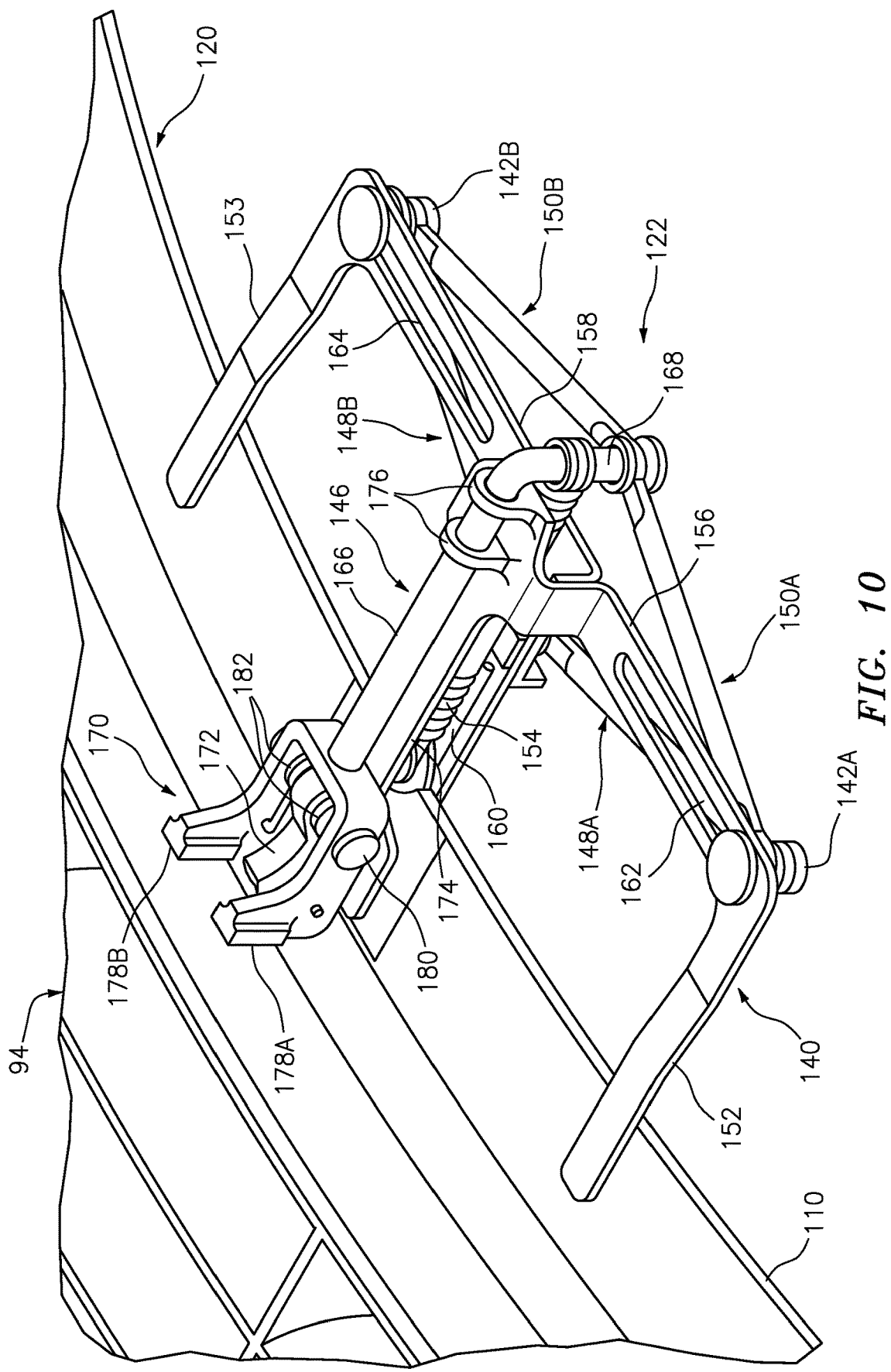
FIG. 10 is a perspective illustration of an outer side of an actuator system connected to a cascade structure.
Figure 11:
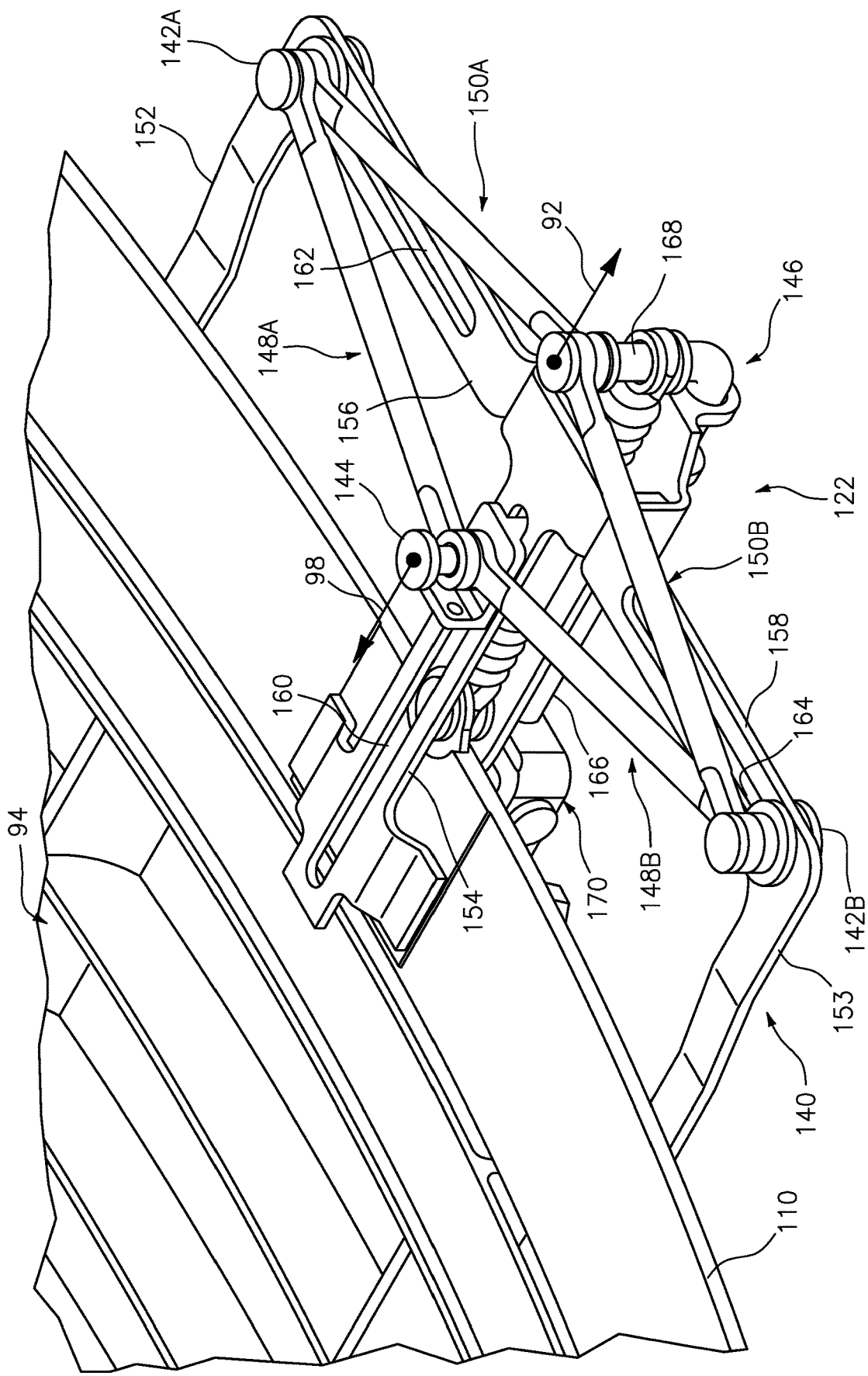
FIG. 11 is a perspective illustration of an inner side of the actuator system connected to the cascade structure.

The actuator systems 122 are arranged circumferentially about the centerline 42. Referring to FIGS. 10 and 11, each actuator system 122 includes a fixed guide 140, one or more lateral track sliders 142A and 142B (e.g., pins), an axial track slider 144 (e.g., pin), a latch 146, one or more slider-to-slider (e.g., forward) links 148A and 148B and one or more slider-to-latch (e.g., aft) links 150A and 150B.

The fixed guide 140 includes one or more axial segments 152-154 (e.g., arms) and one or more lateral segments 156 and 158 (e.g., arms). The axial segments 152-154 of FIGS. 10 and 11 are arranged in parallel with one another and, for example, the centerline 42 (not shown). Each axial segment 152-154 extends axially along the centerline 42 between an axial segment first (forward) end and an axial segment second (e.g., aft) end. Each axial segment 152-154 is fixedly mounted to the cascade structure second mount 110 of a respective one of the cascade structures 94 at its first end. Each axial segment 152-154 projects axially in the first direction 92 away from the cascade structure 94 and along the centerline 42 to its second end. The lateral intermediate axial segment 154 is positioned laterally (e.g., centered) between the lateral side axial segments 152 and 153. This lateral intermediate axial segment 154 is configured with an axial track 160; e.g., an axially elongated slot.

The first side lateral segment 156 is connected to (e.g., formed integrally with) and extends laterally between the first lateral side axial segment 152 and the lateral intermediate segment 154. This first side lateral segment 156 is arranged at the axial segment second ends. The first side lateral segment 156 is configured with a first lateral track 162; e.g., a laterally elongated slot. A centerline of the first lateral track 162 of FIGS. 10 and 11 is arranged perpendicular to a centerline of the axial track 160.

The second side lateral segment 158 is connected to (e.g., formed integrally with) and extends laterally between the second lateral side axial segment 153 and the lateral intermediate segment 154. This second side lateral segment 158 is arranged at the axial segment second ends. The second side lateral segment 158 is configured with a second lateral track 164; e.g., a laterally elongated slot. A centerline of the second lateral track 164 of FIGS. 10 and 11 is arranged perpendicular to the centerline of the axial track 160. The centerline of the second lateral track 164 of FIGS. 10 and 11 is arranged is parallel with and may be coaxial with the centerline of the first lateral track 162.

The first lateral track slider 142A is mated with the first lateral track 162. The first lateral track slider 142A is configured to translate laterally (e.g., circumferentially, tangentially, in a direction perpendicular to the centerline 42 in a plane that is radially spaced from and parallel with the centerline 42, etc.) along the first lateral track 162.

The second lateral track slider 142B is mated with the second lateral track 164. The second lateral track slider 142B is configured to translate laterally (e.g., circumferentially, tangentially, in a direction perpendicular to the centerline 42 in a plane that is radially spaced from and parallel with the centerline 42, etc.) along the second lateral track 164.

The axial track slider 144 is mated with the axial track 160. The axial track slider 144 is configured to translate axially along the axial track 160 and the centerline 42. The axial track slider 144 is also coupled with (e.g., pinned to) the translating frame 120; e.g., see FIG. 12.

The latch 146 is configured to temporarily couple the blocker doors 100 to a respective one of the translating sleeves 52 as described below in further detail; e.g., see FIG. 4. The latch 146 of FIGS. 10 and 11 includes a thrust rod 166, a latch (e.g., pivot) attachment 168, a yoke 170 and a cam 172.

The thrust rod 166 extends axially between a thrust rod first (e.g., forward) end a thrust rod second (e.g., aft) end. The thrust rod 166 is slidably attached to the fixed guide 140 and, more particularly, its intermediate support segment 174 by one or more flanges 176 located proximate or at the axial segment aft end. The thrust rod 166 of FIG. 10, for example, extends axially through apertures in the flanges 176.

The latch attachment 168 is configured as a pin connection (e.g., a pin). The latch attachment 168 is located at the thrust rod second end. More particularly, the latch attachment 168 is connected to and projects radially inward from the thrust rod 166.

Referring to FIG. 10, the yoke 170 has a generally U-shaped geometry. The yoke 170 of FIG. 10, for example, is configured with a first side foot 178A and a second side foot 178B. These feet 178A and 178B (generally referred to as "178") are laterally spaced from one another and connected to the thrust rod 166 at the first end.

Figure 13:
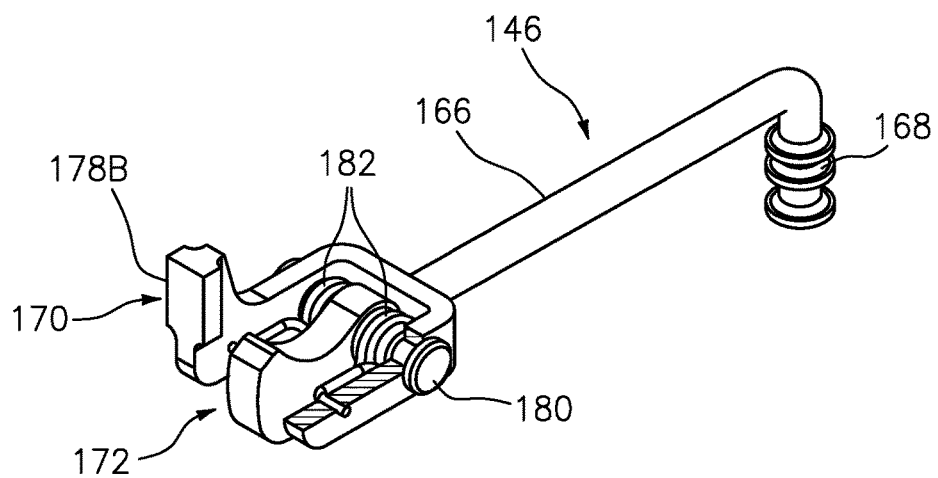
FIG. 13 is a perspective, cutaway illustration of a latch for the actuator system.
Figure 14:
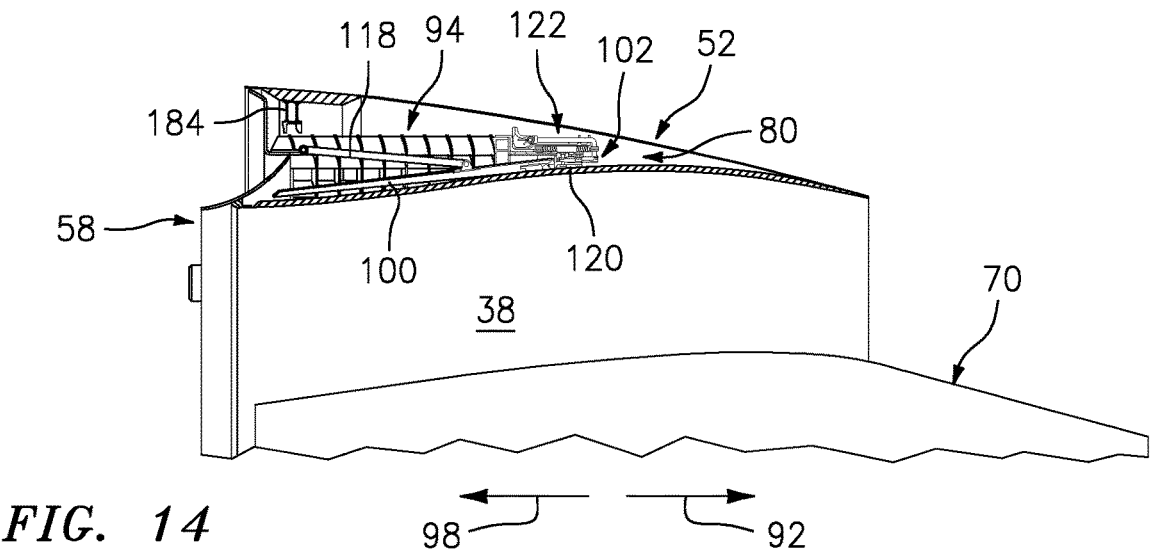
FIGS. 14-19 illustrate a sequence of deploying a portion of the thrust reverser system.
Figure 15:
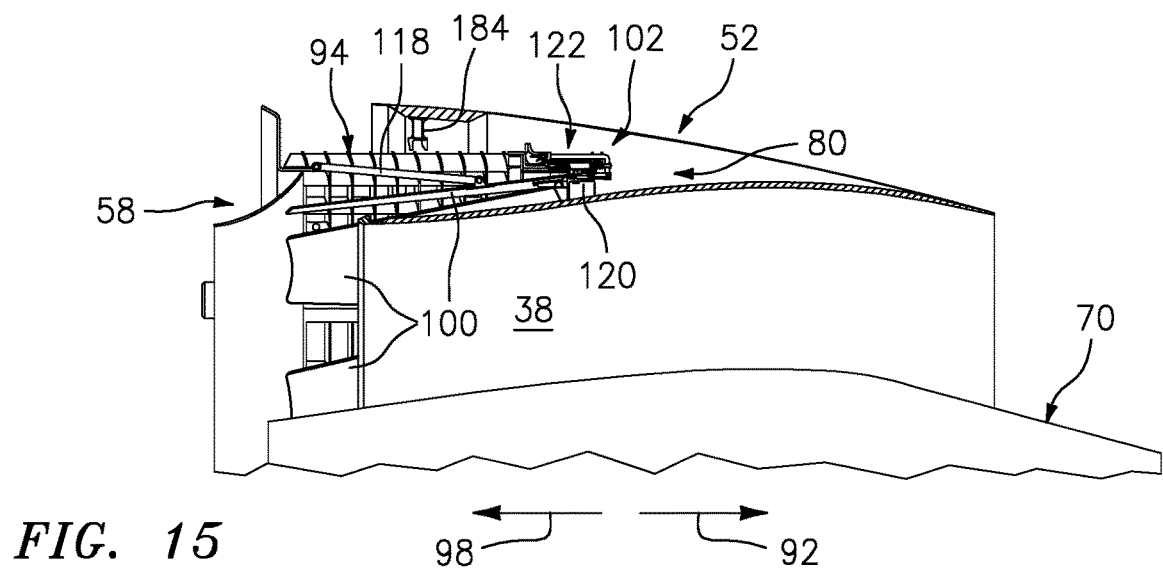
Figure 16:
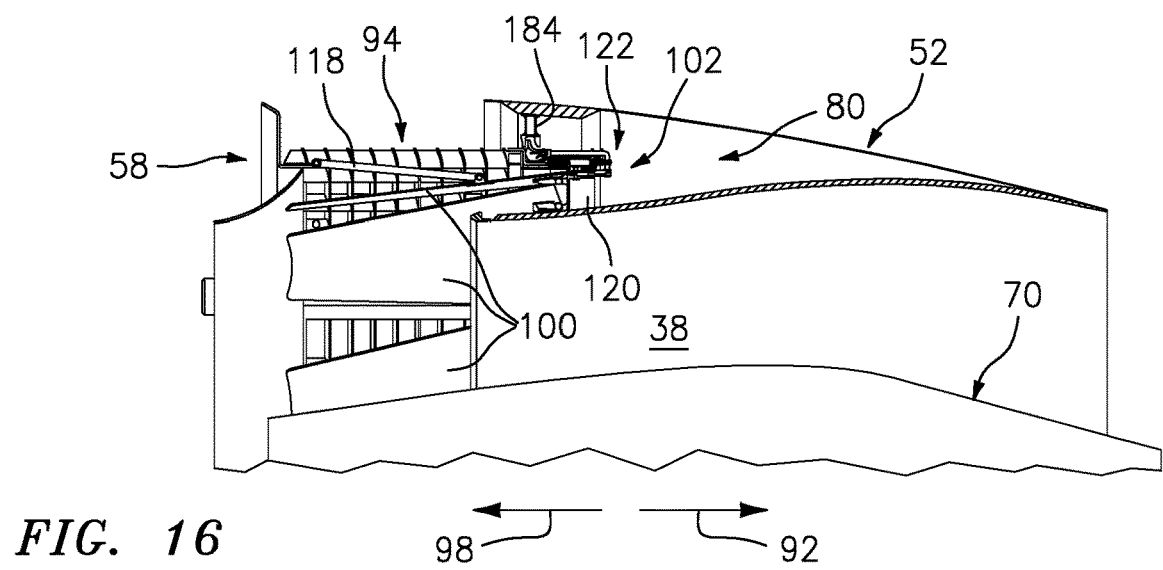
Figure 17:
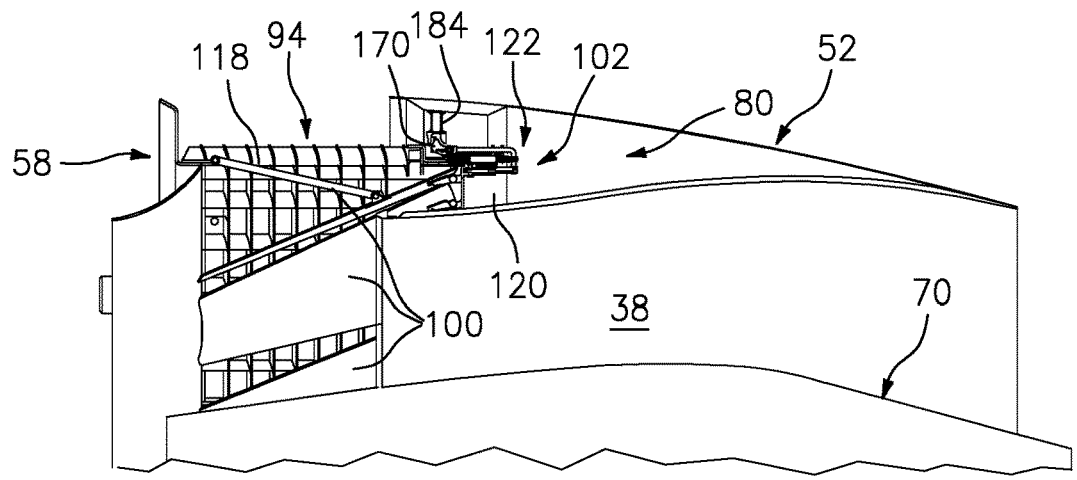
Figure 18:
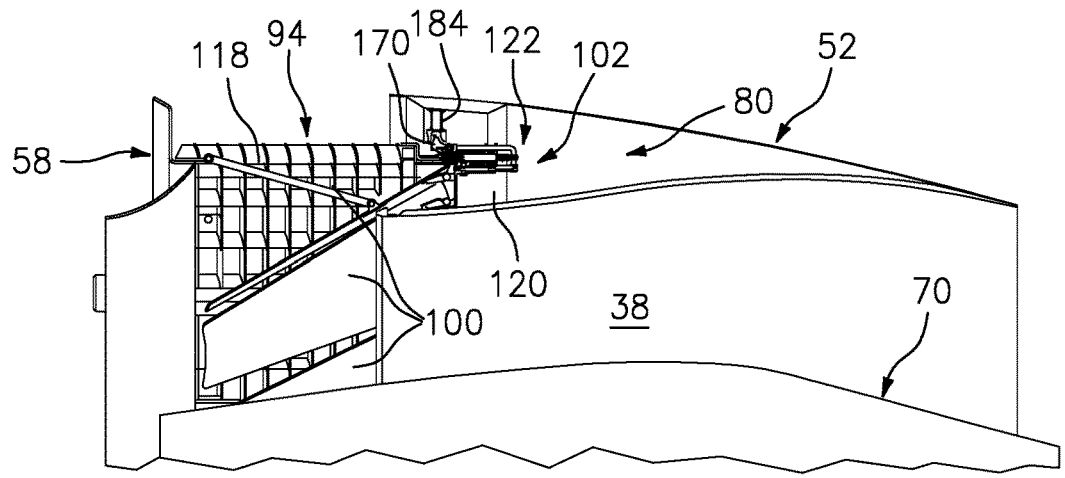
Figure 19:
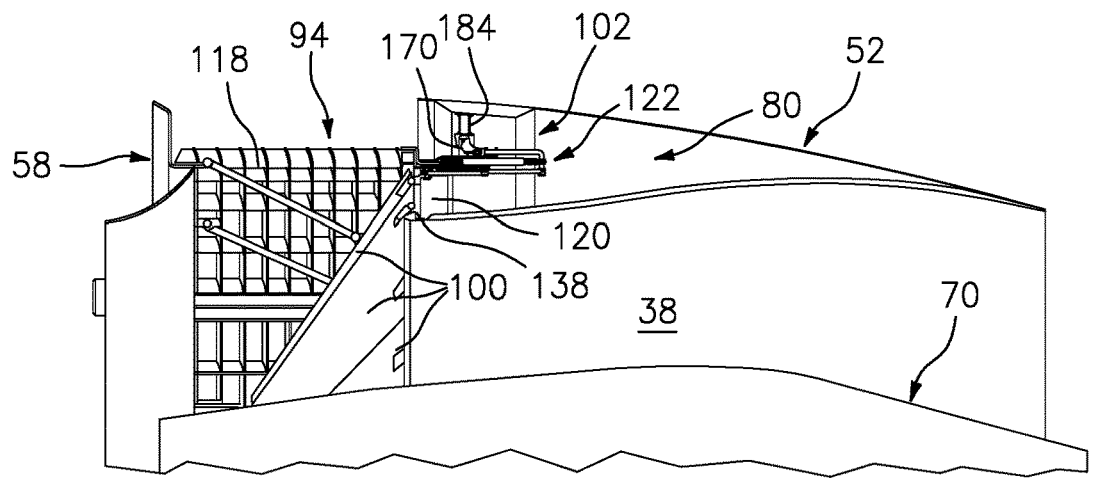

The cam 172 is arranged in a channel formed laterally between the first side foot 178A and the second side foot 178B. The cam 172 of FIG. 10 is moveably (e.g., pivotally) connected to the yoke 170 by a pin 180. Referring to FIG. 13, the cam 172 may also be spring loaded by one or more coil springs 182 wrapped around the pin 180. These springs 182 may bias the cam 172 in a closed position as shown in FIG. 13.

Referring to FIG. 11, each slider-to-slider link 148 extends between a link first (e.g., forward) end and a link second (e.g., aft) end. Each slider-to-slider link extends between and is pivotally connected to the axial track slider 144 and a respective one of the lateral track sliders 142. More particularly, the first slider-to-slider link 148A is pivotally connected to the axial track slider 144 at its link first end. The first slider-to-slider link 148A is pivotally connected to the first lateral track slider 142A at its second end. The second slider-to-slider link 148B is pivotally connected to the axial track slider 144 at its link first end. The second slider-to-slider link 148B is pivotally connected to the second lateral track slider 142B at its second end.

Each slider-to-latch link 150 extends between a link first (e.g., forward) end and a link second (e.g., aft) end. Each slider-to-latch link 150 extends between and is pivotally connected to the latch 146 and a respective one of the lateral track sliders 142. More particularly, the first slider-to-latch link 150A is pivotally connected to the first lateral track slider 142A at its first end. The first slider-to-latch link 150A is pivotally connected to the latch attachment 168 at its second end. The second slider-to-latch link 150B is pivotally connected to the second lateral track slider 142B at its first end. The second slider-to-latch link 150B is pivotally connected to the latch attachment 168 at its second end.

With the arrangement of the links 148 and 150 described above and illustrated in FIGS. 10 and 11, each actuator system 122 is configured with a scissor-type linkage; e.g., an inverse scissor linkage. The present disclosure, however, is not limited to such an exemplary actuator system configuration.

During propulsion system 30 operation, the thrust reverser system 34 may be actuated and deployed as illustrated by the sequence of FIGS. 14 to 19. At the beginning (e.g., start) of this deployment sequence (see FIG. 14), the thrust reverser components 94, 100, 118, 120 and 122 are within the cavities 80 as described above. More particularly, the components 94, 100, 118, 120 and 122 are substantially completely housed within the cavities 80 and, thus, are outside (e.g., radially outboard) of the bypass flow path 38.

During a first (e.g., initial) portion of the deployment sequence (see FIGS. 14-16), each translating sleeve 52 moves substantially axially in the first direction 92 away from the forward nacelle structure 48 (see FIG. 3) and the stationary support 58. More particularly, each translating sleeve 52 translates axially aft from the sleeve stowed position (see FIG. 14) to a sleeve intermediate position (see FIG. 16), which sleeve intermediate position is between the sleeve stowed position (see FIG. 14) and the sleeve deployed position (see FIG. 19). During this first portion of the translating sleeve 52 stroke, the other components 94, 100, 118, 120 and 122 of the thrust reverser system 34 may remain stationary. Thus, each translating sleeve 52 moves axially relative to the other components 94, 100, 118, 120 and 122 of the thrust reverser system 34. This relative movement results in one or more of the components 94, 100, 118, 120 and 122 being at least partially axially withdrawn from the cavities 80. However, because the components 94, 100, 118, 120 and 122 themselves are not moving, the components 94, 100, 118, 120 and 122 may remain outside (e.g., radially outboard) of the bypass flow path 38.

Figure 12:
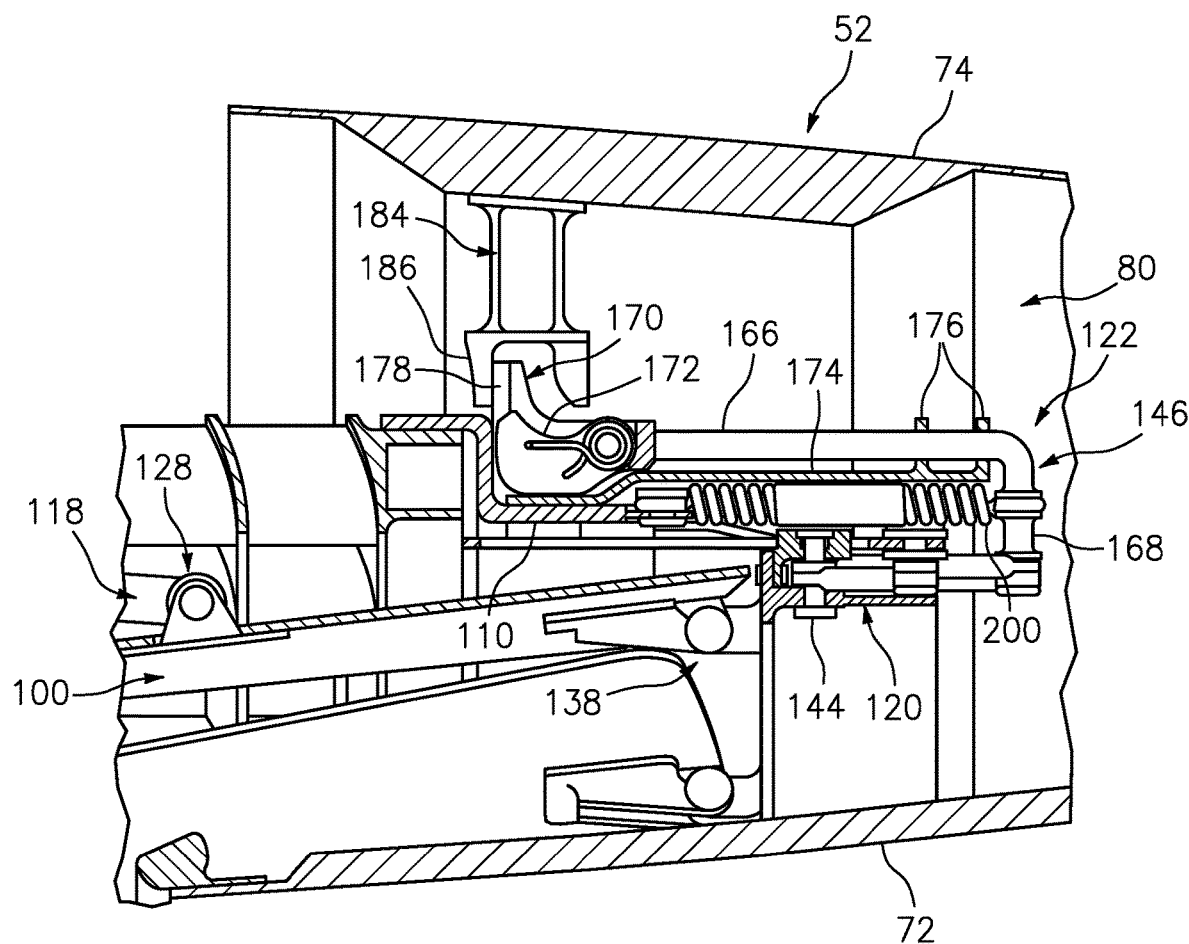
FIG. 12 is a side sectional illustration of the actuator system configured with other components of the thrust reverser system.
Figure 24:
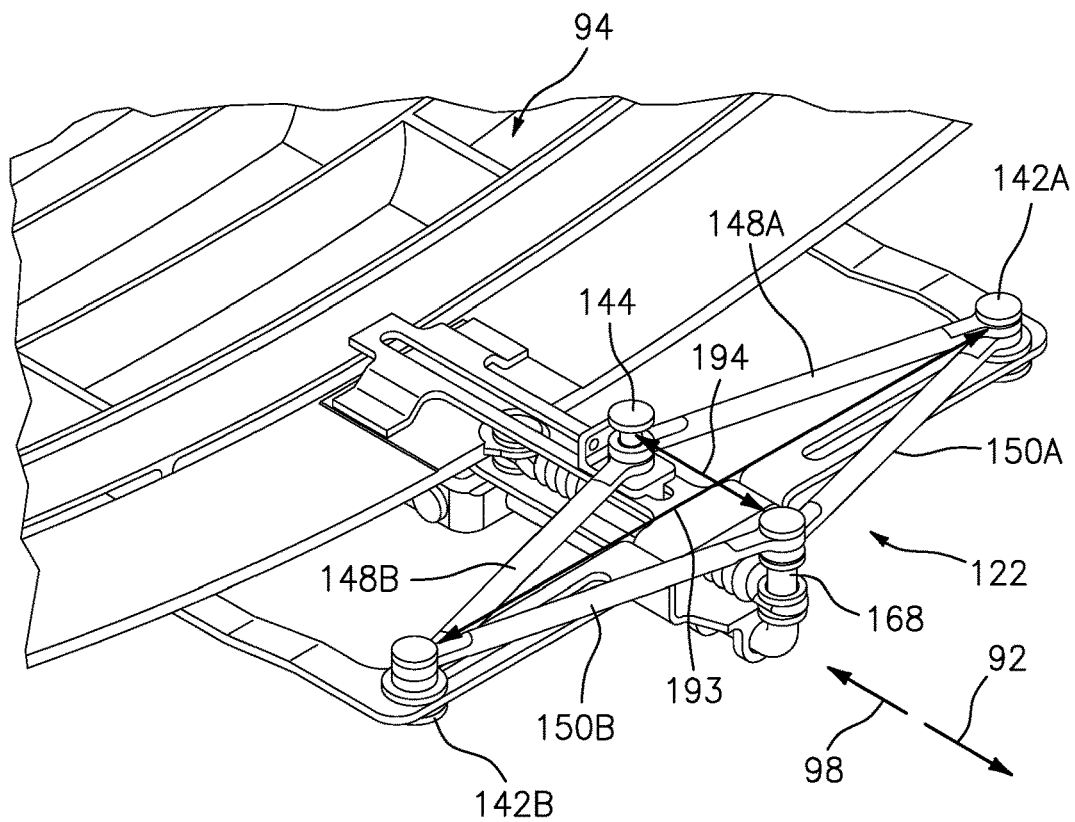
FIG. 24 is a perspective illustration of the actuator system when the blocker doors are in stowed positions.
Figure 25:
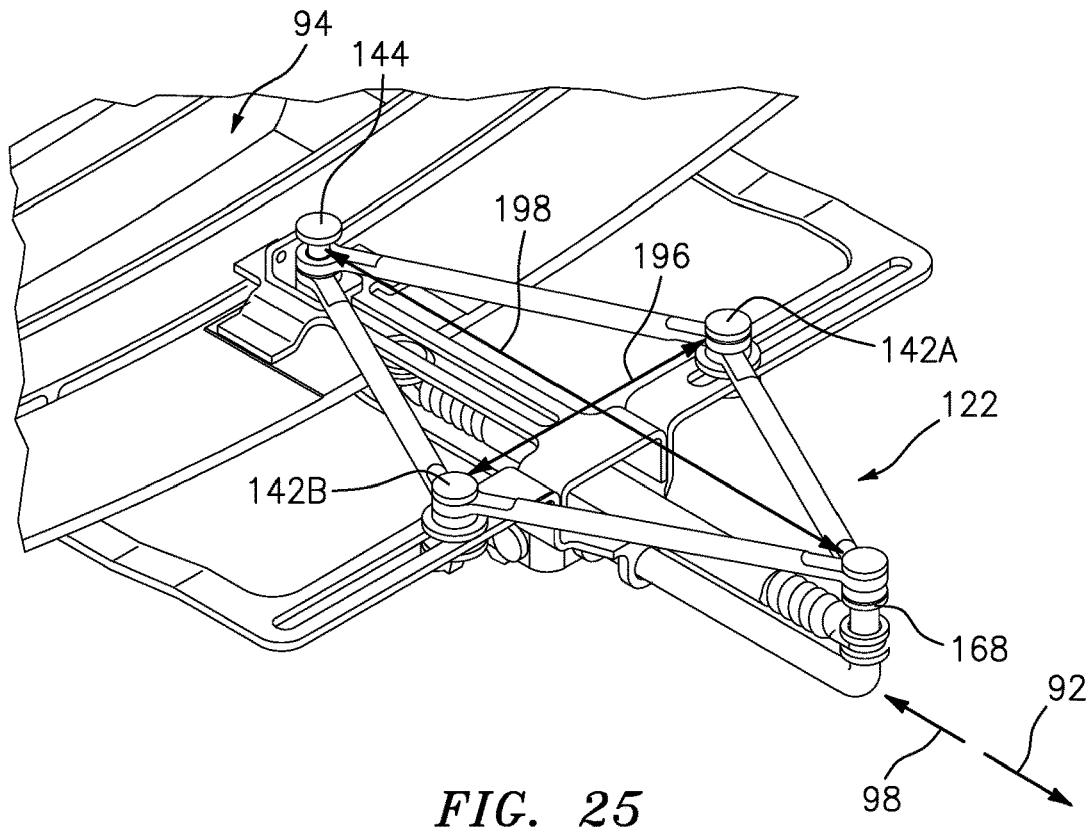
FIG. 25 is a perspective illustration of the actuator system when the blocker doors are in deployed positions.

Referring to FIG. 12, at the intermediate position, a trigger 184 mounted to or included with the translating sleeve 52 temporarily engages (e.g., axially contacts) a respective one of the yokes 170. More particularly, a pair of deployment feet 186 of the trigger 184 (one visible in FIG. 12) respectively engage the yoke feet 178. As a result, as each translating sleeve 52 continues to move in the first direction 92 from the intermediate position (see FIG. 16) to the deployed position (see FIG. 19), the trigger 184 pushes against the yoke 170 and moves the yoke 170 in the first direction 92 as shown in the sequence of FIGS. 20 to 23. This first direction 92 movement of the yoke 170 in turn causes the links 148 and 150 to laterally close as shown in the sequence of FIGS. 24 and 25. The lateral closing of the links 148 and 150 in turn causes the axial track slider 144 to move in the second (e.g., forward) direction and push the translating frame 120 (see FIGS. 20-23) and the pivot attachments 138 in the second direction 98. Each pivot attachment 138 thereby moves from a first (e.g., aft) location (see FIG. 16) to a second (e.g., forward) location (see FIG. 19) and thereby deploy the blocker doors 100 radially inward into the bypass flow path 38 and towards the centerline 42 (not shown); e.g., movement of the blocker doors 100 is controlled by the respective links 118. Thus, as each translating sleeve 52 continues to move in the first direction 92 from the sleeve intermediate position (see FIG. 16) to the sleeve deployed position (see FIG. 19), the blocker door actuation system 102 causes each blocker door 100 to move from its stowed position (see FIGS. 14-16) to its (e.g., fully) deployed position (see FIG. 19).

Figure 20:
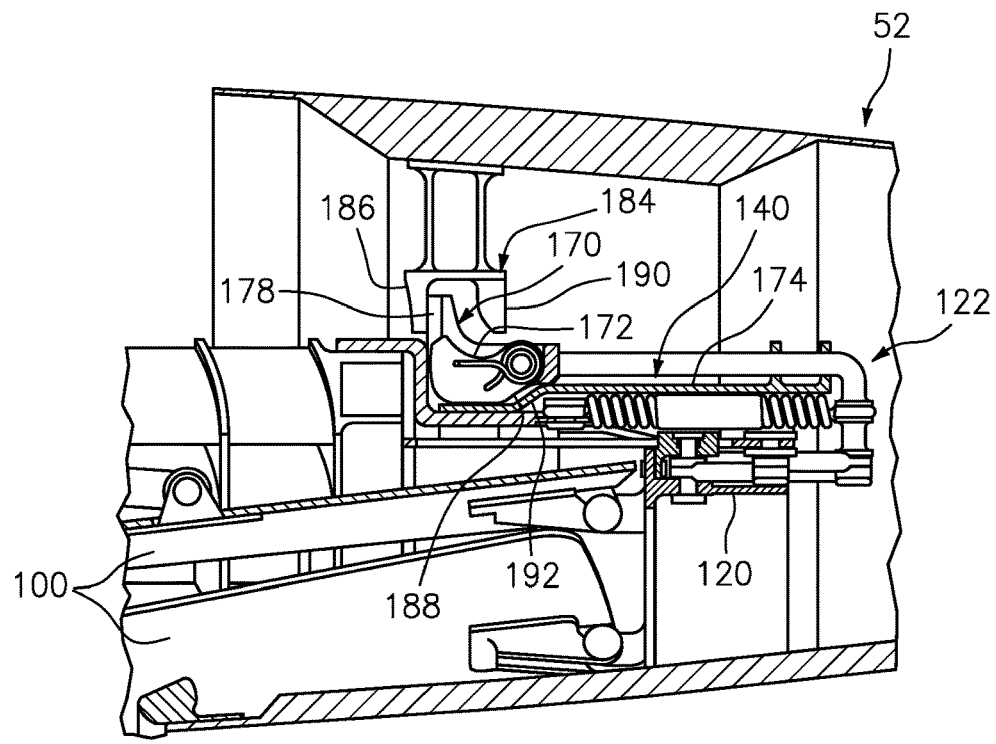
FIGS. 20-23 illustrate a sequence of movement of the actuator system during the deployment of blocker doors.
Figure 21:
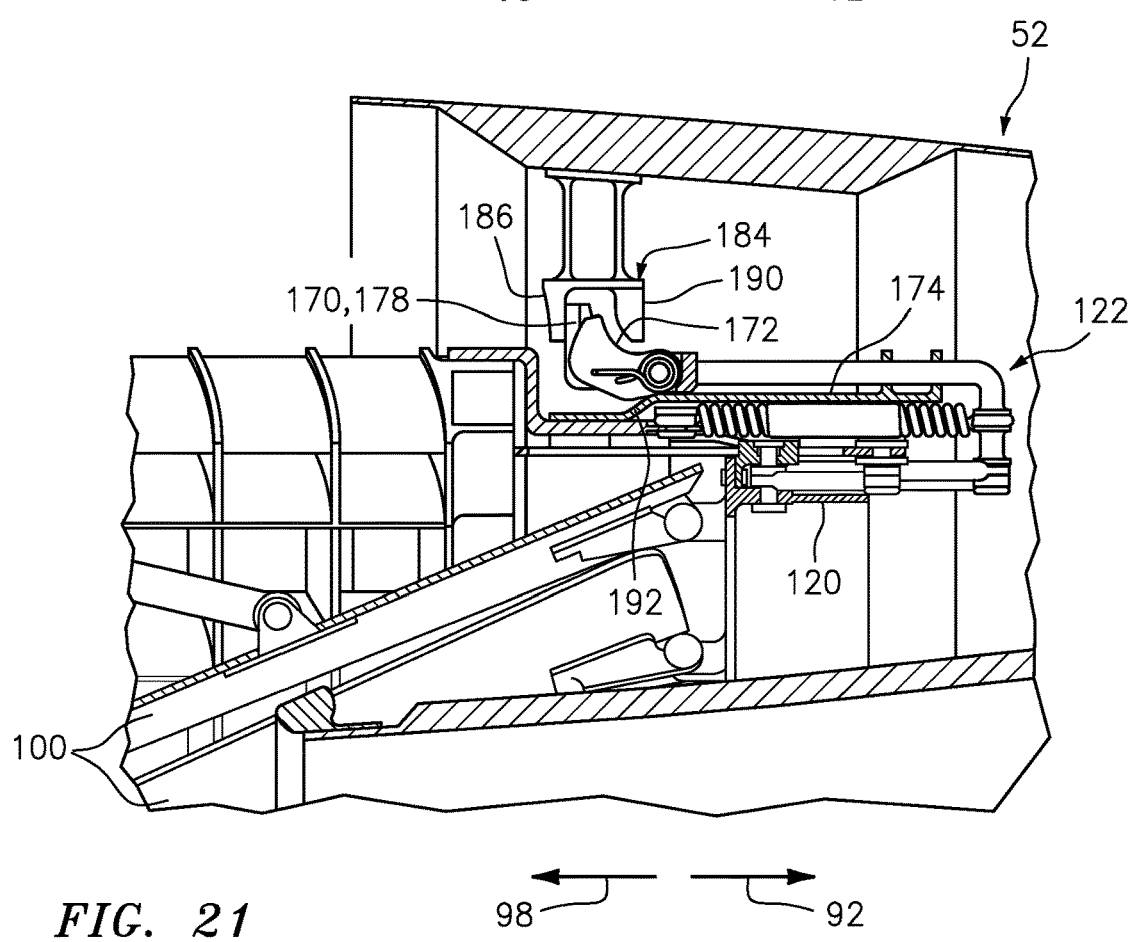
Figure 22:
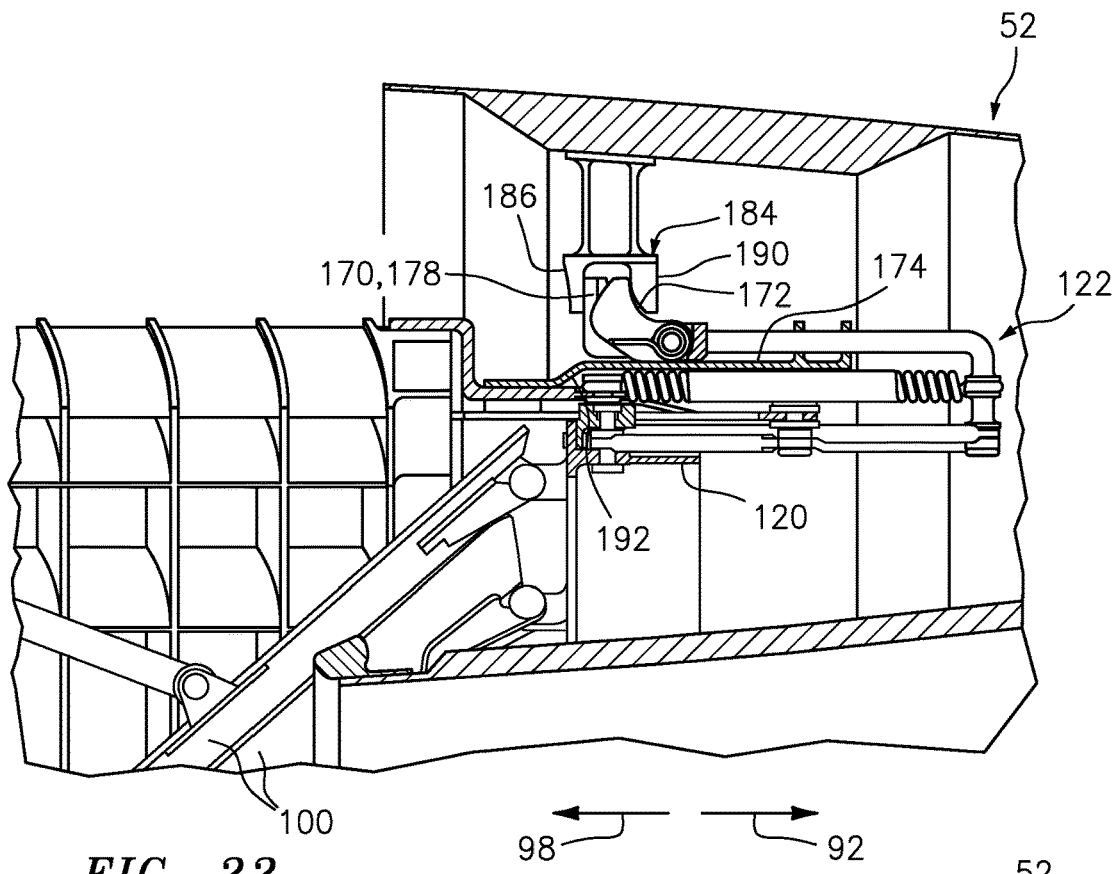
Figure 23:
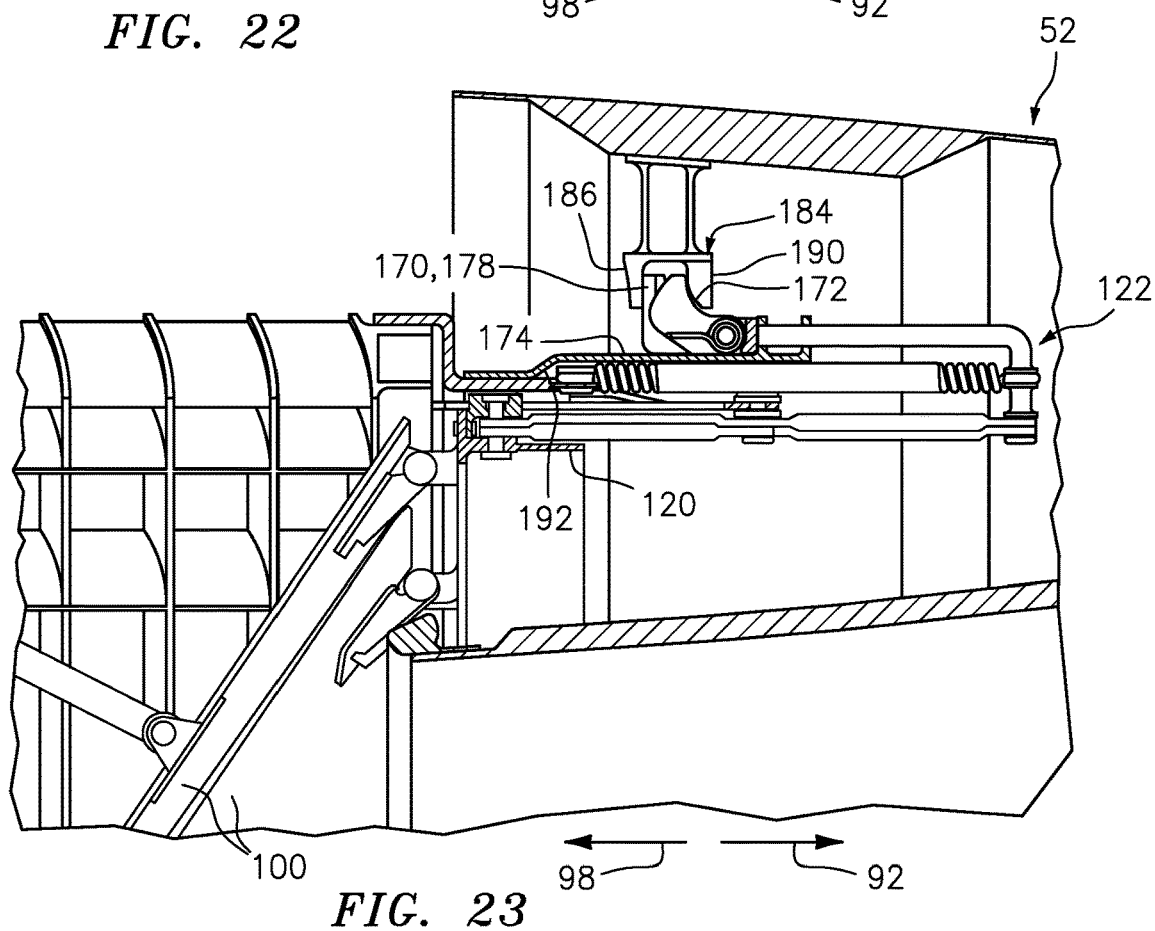

When the blocker doors 100 are in their stowed positions (see FIGS. 14-16), each cam 172 is seated in a recess 188 of the respective fixed guide 140 and its intermediate support segment 174 as shown in FIG. 20 with the help of spring 182. While the cam 172 is seated within the recess 188 (e.g., stowed), a retraction foot 190 of the trigger 184 is able to pass laterally in between the yoke feet 178 and axially over the cam 172. However, as the trigger 184 pushes the yoke 170 in the first direction 92 (see sequence of FIGS. 20-23), the cam 172 rotates radially outward into a deployed position. More particularly, as the yoke 170 moves in the first direction 92, the cam 172 slides along a ramp 192 on the respective intermediate support segment 174 which causes the cam 172 to rotate radially outward until, for example, the cam 172 abuts against and axially engages (e.g., contacts) the retraction foot 190. In this position, the cam 172 is operable to facilitate stowage of the blocker doors 100 when the respective translating sleeve 52 moves in the second direction 98 from the sleeve deployed position (see FIG. 19) to the sleeve intermediate position (see FIG. 16). In other words, the retraction foot 190 pushes axially against the cam 172 so as to cause the blocker door actuation system 102 to reverse its operation and thereby move the blocker doors 100 from their deployed position (see FIG. 19) to their stowed position (see FIG. 16).

Referring again to FIG. 24, when the blocker doors 100 are in their stowed positions, the lateral track sliders 142 are separated by a first lateral distance 193 and the axial track slider 144 and the attachment 168 are separated by a first axial distance 194. Referring to FIG. 25, when the blocker doors 100 are in their deployed positions, the track sliders 142 are separated by a second lateral distance 196 and the axial track slider 144 and the attachment 168 are separated by a second axial distance 198. The first lateral distance 193 is greater than the second lateral distance 196. The first axial distance 194 is less than the second axial distance 198.

In some embodiments, referring to FIG. 12, a spring element 200 (e.g., a coil spring) may be configured with the latch 146 to bias the latch 146 in its stowed/forward position. This spring element 200 may extend between and be attached to the attachment 168 and the second mount 110.

While the thrust reverser system 34 is described above with a pair of the translating sleeves 52 and components associated with each sleeve 52, the present disclosure is not limited to such an exemplary configuration. For example, in other embodiments, the thrust reverser system 34 may be configured with a single one of the translating sleeves 52 that, for example, extends substantially circumferentially about the centerline 42; e.g., where the flow path 28 is configured with an O-duct rather than a D-duct (or C-duct) as described above.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft propulsion system, comprising:
   a thrust reverser system including a sleeve, a fixed cascade structure and a blocker door;
   the sleeve configured to translate in an aft direction along a centerline from a sleeve stowed position to a sleeve deployed position;
   the fixed cascade structure disposed within a cavity of the sleeve when the sleeve is in the sleeve stowed position;
   the blocker door configured to move between a blocker door stowed position and a blocker door deployed position, the blocker door disposed within the cavity of the sleeve when the sleeve is in the sleeve stowed position and the blocker door is in the blocker door stowed position, and the blocker door projecting in a radial inward direction away from the sleeve towards the centerline when the sleeve is in the sleeve deployed position and the blocker door is in the blocker door deployed position;
   the blocker door comprising a pivot attachment fixed at an end of the blocker door, the pivot attachment configured to move in a forward direction from a first location to a second location;
   a fixed structure comprising a frame track; and
   a frame extending circumferentially about the centerline to a frame side, the frame comprising a frame slider at the frame side, and the frame slider configured to translate along the frame track as the blocker door moves towards and away from the blocker door deployed position;
   the pivot attachment pivotally attaching the blocker door to the frame; and
   the thrust reverser system further including
      a fixed guide comprising a first lateral track and an axial track;
      a first lateral track slider configured to translate, laterally relative to the centerline, along the first lateral track;
      an axial track slider configured to translate, axially along the centerline, along the axial track, and the axial track slider coupled to the frame;
      a latch configured to selectively mate with the sleeve;
      a first forward link extending between and pivotally connected to the first lateral track slider and the axial track slider; and
      a first aft link extending between and pivotally connected to the first lateral track slider and the latch.

2. The assembly of claim 1, wherein the thrust reverser system further includes:
   a second lateral track slider configured to translate, laterally relative to the centerline, along a second lateral track of the fixed guide, wherein the latch is arranged laterally between the first lateral track and the second lateral track;
   a second forward link extending between and pivotally connected to the second lateral track slider and the axial track slider; and
   a second aft link extending between and pivotally connected to the second lateral track slider and the latch.

3. The assembly of claim 2, wherein
   the first lateral track slider and the second lateral track slider are laterally separated by a first distance when the blocker door is in the blocker door stowed position;
   the first lateral track slider and the second lateral track slider are laterally separated by a second distance when the blocker door is in the blocker door deployed position; and
   the first distance greater than the second distance.

4. The assembly of claim 2, wherein
   a pin attachment pivotally connecting the first aft link and the second aft link to the latch;
   the axial track slider and the pin attachment are axially separated by a first distance when the blocker door is in the blocker door stowed position;
   the axial track slider and the pin attachment are axially separated by a second distance when the blocker door is in the blocker door deployed position; and
   the first distance less than the second distance.

5. The assembly of claim 1, wherein the latch includes
   a thrust rod extending between a forward thrust rod end and an aft thrust rod end;
   a pin attachment pivotally connecting the first aft link to the thrust rod at the aft thrust rod end;
   a yoke connected to the thrust rod at the forward thrust rod end, the yoke configured to engage a trigger mounted to the sleeve as the sleeve translates in the aft direction towards the sleeve deployed position; and
   a cam pivotally connected to the latch, the cam configured to engage the trigger as the sleeve translates in the forward direction towards the sleeve stowed position, wherein the trigger is axially between the yoke and the cam when the trigger engages the latch.

6. An assembly for an aircraft propulsion system, comprising:
   a thrust reverser system including a sleeve, a fixed cascade structure and a blocker door;
   the sleeve configured to translate in an aft direction along a centerline from a sleeve stowed position to a sleeve deployed position;
   the fixed cascade structure disposed within a cavity of the sleeve when the sleeve is in the sleeve stowed position;
   the blocker door configured to move between a blocker door stowed position and a blocker door deployed position, the blocker door disposed within the cavity of the sleeve when the sleeve is in the sleeve stowed position and the blocker door is in the blocker door stowed position, and the blocker door projecting in a radial inward direction away from the sleeve towards the centerline when the sleeve is in the sleeve deployed position and the blocker door is in the blocker door deployed position;
   the blocker door comprising a pivot attachment fixed at an end of the blocker door, the pivot attachment configured to move in a forward direction from a first location to a second location; and
   the thrust reverser system further including
      a guide fixed to the fixed cascade structure, the guide comprising a first lateral track and an axial track;
      a first lateral track slider configured to laterally translate along the first lateral track;
      an axial track slider configured to axially translate along the axial track, the axial track slider configured to facilitate movement of the pivot attachment between the first location and the second location;
      a latch configured to temporarily couple with the sleeve while the sleeve translates between a sleeve intermediate position and the sleeve deployed position;
      a first slider-to-slider link extending between and pivotally connected to the first lateral track slider and the axial track slider; and a first slider-to-latch link extending between and pivotally connected to the first lateral track slider and the latch.

7. The assembly of claim 6, wherein the thrust reverser system further includes
a second lateral track slider configured to translate along a second lateral track of the guide, wherein the latch is arranged laterally between the first lateral track and the second lateral track;
a second slider-to-slider link extending between and pivotally connected to the second lateral track slider and the axial track slider; and
a second slider-to-latch link extending between and pivotally connected to the second lateral track slider and the latch.

\* \* \* \* \*